US010853978B1

(12) United States Patent
Knas

(10) Patent No.: US 10,853,978 B1
(45) Date of Patent: Dec. 1, 2020

(54) INTELLIGENT AND CONTEXT AWARE READING SYSTEMS

(71) Applicant: MASSACHUSETTS MUTUAL LIFE INSURANCE COMPANY, Springfield, MA (US)

(72) Inventor: Michal Knas, Monson, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 168 days.

(21) Appl. No.: 15/336,533

(22) Filed: Oct. 27, 2016

Related U.S. Application Data

(60) Provisional application No. 62/249,673, filed on Nov. 2, 2015.

(51) Int. Cl.
| | |
|---|---|
| *G06T 11/60* | (2006.01) |
| *G06F 3/01* | (2006.01) |
| *G06K 9/00* | (2006.01) |
| *G06F 3/0481* | (2013.01) |

(52) U.S. Cl.
CPC ............. *G06T 11/60* (2013.01); *G06F 3/013* (2013.01); *G06F 3/0481* (2013.01); *G06K 9/00315* (2013.01)

(58) Field of Classification Search
CPC .... G06T 11/60; G06K 9/00315; G06K 3/013; G06K 3/0481; G06K 3/015
See application file for complete search history.

(56) References Cited

U.S. PATENT DOCUMENTS

| | | | | |
|---|---|---|---|---|
| 9,335,819 | B1 * | 5/2016 | Jaeger | G06F 3/013 |
| 2004/0201633 | A1 * | 10/2004 | Barsness | G06F 16/34 |
| | | | | 715/864 |
| 2008/0243828 | A1 * | 10/2008 | Reztlaff | G06F 16/319 |
| 2009/0112813 | A1 * | 4/2009 | Jung | G06F 16/903 |
| 2012/0256967 | A1 * | 10/2012 | Baldwin | G06F 3/013 |
| | | | | 345/684 |
| 2013/0340005 | A1 * | 12/2013 | Kwan | H04N 5/44543 |
| | | | | 725/39 |
| 2016/0239161 | A1 * | 8/2016 | Heo | G06F 3/0482 |
| 2016/0357253 | A1 * | 12/2016 | Abraham | G06F 40/169 |

* cited by examiner

*Primary Examiner* — Roland J Casillas
(74) *Attorney, Agent, or Firm* — Foley & Lardner LLP

(57) ABSTRACT

Disclosed herein are systems and methods for an intelligent and context-aware reading system. The method comprises generating a visual presentation using output data for display on a user interface. The method comprises generating an instruction to initiate an expression sensor device configured to track micro-expressions and generate expression sensor data. The method comprises receiving expression sensor data, associated with a user operating the user interface, from the expression sensor. The method comprises determining an expression state of the user based on the received expression sensor data. The method comprises determining a portion of the output data, which corresponds to a portion of the visual presentation displayed on the user interface when the expression sensor data is received. The method comprises generating supplemental content data for the portion of the output data in response to determining the expression state of the user as a first expression state.

18 Claims, 10 Drawing Sheets

INTELLIGENT AND CONTEXT AWARE READING SYSTEMS

CROSS-REFERENCE TO RELATED APPLICATION

This application claims priority to U.S. Provisional Patent Application Ser. No. 62/249,673, filed on Nov. 2, 2015, which is hereby incorporated by reference in its entirety.

FIELD OF THE DISCLOSURE

The present disclosure relates in general to systems and methods for displaying electronic content, and more specifically, to systems and methods for dynamically modifying electronic content based on ocular and expressive feedback.

BACKGROUND

As the processing power of computers allow for greater computer functionality and the Internet technology era allows for interconnectivity between computing systems, many users view an ever-increasing amount of electronic content using a variety of electronic display platforms. Numerous efforts have been undertaken to improve the electronic display platforms to allow users to view the electronic content more quickly while sustaining a high level of comprehension. Even though conventional methods have attempted to provide better tools for displaying the electronic content, they have failed to modify the content based on user's desires or comprehension level. This shortcoming is sometime due to the challenging nature of dynamic generation of electronic content, which may exist on different networks or computing infrastructure. Managing such information may be difficult due to a number or size of the data. Furthermore, many conventional methods have failed to provide an efficient method to modify the electronic content because of the difficult nature of gaging user's experience or variations in user's comprehension levels while viewing the electronic content.

SUMMARY

For the aforementioned reasons, it is desirable to have a system that allows users to view the electronic content in an efficient manner by dynamically modifying the content based on gaging user's comprehension level, desire, or expressions.

Disclosed here are systems and methods for presenting supplemental content to a user. In an embodiment, a method comprises generating a visual presentation using an output data for display on a user interface of a computing device. The method comprises generating a first instruction configured to initiate an expression sensor device configured to track micro-expressions and generate expression sensor data, wherein the expression sensor device is associated with the user interface of the computing device. The method comprises receiving expression sensor data from the expression sensor device, upon transmitting the first instruction to the expression sensor device, wherein the expression sensor data is associated with a user operating the user interface of the computing device. The method comprises determining an expression state of the user based on the received expression sensor data. The method comprises determining a portion of the output data, wherein the portion of the output data corresponds to a portion of the visual presentation displayed on the user interface when the expression sensor data is received. The method comprises generating supplemental content data for the portion of the first output data corresponding with the first expression state of the user, in response to determining the expression state of the user as a first expression state.

In another embodiment, a computer system comprises a server, which is configured to generate a visual presentation using an output data for display on a user interface of a computing device. The server is further configured to generate a first instruction configured to initiate an expression sensor device configured to track micro-expressions and generate expression sensor data, wherein the expression sensor device is associated with the user interface of the computing device. The server is further configured to receive expression sensor data from the expression sensor device, upon transmitting the first instruction to the expression sensor device, wherein the expression sensor data is associated with a user operating the user interface of the computing device. The server is further configured to determine an expression state of the user based on the received expression sensor data. The server is further configured to determine a portion of the output data, wherein the portion of the output data corresponds to a portion of the visual presentation displayed on the user interface when the expression sensor data is received. The server is further configured to generate supplemental content data for the portion of the first output data corresponding with the first expression state of the user, in response to determining the expression state of the user as a first expression state.

In another embodiment, a method comprises generating a visual presentation using an output data for display on a user interface of a computing device. The method comprises generating a first instruction configured to initiate an eye-tracking sensor device configured to track movement of at least one eye and generate ocular sensor data, wherein the eye-tracking sensor device is associated with the user interface of the computing device. The method comprises receiving ocular sensor data from the expression sensor device for a user, upon transmitting the first instruction to the eye-tracking sensor device, wherein the user is operating the user interface of the computing device. The method comprises generating ocular engagement data based on received ocular sensor data, wherein the ocular engagement data is associated with a portion of the output data displayed on the user interface. The method further comprises generating supplemental content data for the portion of the output data corresponding to the ocular engagement data, in response to an ocular engagement value satisfying a pre-determined threshold, wherein the ocular engagement value corresponds to ocular engagement data.

In another embodiment, a computer system comprises a server, which is configured to generate a visual presentation using an output data for display on a user interface of a computing device. The server is further configured to generate a first instruction configured to initiate an eye-tracking sensor device configured to track movement of at least one eye and generate ocular sensor data, wherein the eye-tracking sensor device is associated with the user interface of the computing device. The server is further configured to receive ocular sensor data from the expression sensor device for a user, upon transmitting the first instruction to the eye-tracking sensor device, wherein the user is operating the user interface of the computing device. The server is further configured to generate ocular engagement data based on received ocular sensor data, wherein the ocular engagement data is associated with a portion of the output data displayed on the user interface. The server is further configured to generate supplemental content data for the portion of the output data corresponding to the ocular engagement data, in response to an ocular engagement value satisfying a pre-determined threshold, wherein the ocular engagement value corresponds to ocular engagement data.

In another embodiment, a method comprises generating a graphical user interface on a display of a computing device, wherein the graphical user interface comprises a plurality of fields configured to receive an input from the computing device. The method comprises generating an instruction configured to initiate an eye-tracking sensor device configured to track movement of at least one eye and generate ocular sensor data, wherein the eye-tracking sensor device is associated with the user interface of the computing device. The method comprises receiving ocular sensor data from the eye-tracking sensor device for a user, upon transmitting the instruction to the eye-tracking sensor device, wherein the user is operating the graphical user interface of the computing device. The method comprises generating ocular engagement data based on received ocular sensor data, wherein the ocular engagement data is associated with a portion of a first field on the graphical user interface displayed on the computing device. The method further comprises generating supplemental content data for the portion of the first field on the graphical user interface corresponding with the ocular engagement data, in response to an ocular engagement value satisfying a pre-determined threshold.

In another embodiment, a computer system comprises a server, which is configured to generate a graphical user interface on a display of a computing device, wherein the graphical user interface comprises a plurality of fields configured to receive an input from the computing device. The server is further configured to generate an instruction configured to initiate an eye-tracking sensor device configured to track movement of at least one eye and generate ocular sensor data, wherein the eye-tracking sensor device is associated with the user interface of the computing device. The server is further configured to receive ocular sensor data from the eye-tracking sensor device for a user, upon transmitting the instruction to the eye-tracking sensor device, wherein the user is operating the graphical user interface of the computing device. The server is further configured to generate ocular engagement data based on received ocular sensor data, wherein the ocular engagement data is associated with a portion of a first field on the graphical user interface displayed on the computing device. The server is further configured to generate supplemental content data for the portion of the first field on the graphical user interface corresponding with the ocular engagement data, in response to an ocular engagement value satisfying a pre-determined threshold.

In another embodiment a method comprises generating a graphical user interface on a display of a computing device, wherein the graphical user interface comprises a plurality of fields configured to receive an input from the computing device. The method comprises generating an instruction configured to initiate an expression sensor device configured to track micro-expressions and generate expression sensor data, wherein the expression sensor data device is associated with the graphical user interface of the computing device. The method comprises upon transmitting the instruction to the expression sensor device, receiving expression sensor data from the expression sensor device for a user, wherein the user is operating the graphical user interface of the computing device. The method comprises determining an expression state of the user based on the received expression sensor data. The method comprises determining a portion of a first field of the graphical user interface, wherein the portion of the first field corresponds to portion of the graphical user interface displayed when the expression sensor data is received. The method further comprises in response to determining the expression state of the user as a first expression state, generating supplemental content data for the portion of the first field.

In another embodiment, a computer system comprises a server, which is configured to generate a graphical user interface on a display of a computing device, wherein the graphical user interface comprises a plurality of fields configured to receive an input from the computing device. The server is further configured to generate an instruction configured to initiate an expression sensor device configured to track micro-expressions and generate expression sensor data, wherein the expression sensor data device is associated with the graphical user interface of the computing device. The server is further configured to receive expression sensor data from the expression sensor device for a user, wherein the user is operating the graphical user interface of the computing device, upon transmitting the instruction to the expression sensor device. The server is further configured to determine an expression state of the user based on the received expression sensor data. The server is further configured to determine a portion of a first field of the graphical user interface, wherein the portion of the first field corresponds to portion of the graphical user interface displayed when the expression sensor data is received. The server is further configured to generate supplemental content data for the portion of the first field, in response to determining the expression state of the user as a first expression state.

In some embodiments, systems and methods for presenting supplemental content to a user comprises a user device, an external data source, and a communications network. In these embodiments, the user device further comprises a communication module, an input/output module, a user interface, an eye-tracking module, an eye-tracking sensor module, an expression processing module, an expression sensor module, an authentication module, and a content processing module.

In these embodiments, the user interface is configured to receive a first input comprising credentials associated with the user, process the first input into first input data, and provide the first input data to the input/output module. The input/output module then processes the first input data into credential data, and provides the credential data to the authentication module, and the authentication module verifies that the user is authorized to operate the user device. The user then operates the user device and provides a second input comprising a request that content (e.g., a specific RSVP text) be displayed on the user device via the user interface. The user interface receives the second input, generates second input data, and provides the second input data to the input/output module. The input/output module then generates user instruction data and provides the user instruction data to the content processing module. The content processing module then processes the user instruction data and determines that one or more portions of the requested content are stored as internal content data within a storage device associated with the user device, and one or more other portions not stored within the storage device may be stored as external content data within the external data source or within a database. The content processing module proceeds to generate a first command data (e.g., an instruction) comprising a request for external content data, and provides the first command data to the communication module. The communication module receives the first command data, generates a first query data, and provides the first query data to the external data source. The external data source receives the first query data, processes it to generate a first result data, and provides the first result data to the communication module. The communication module receives the first result data, processes the first result data to generate external content data, and provides the external content data to the content processing module. The content processing module then receives the external content data, retrieves the internal content data from the storage device associated with the user device, and processes the external content data and internal content data to generate a first output data. The content processing module then provides the first output data to the input/output module, the input/output module processes the first output data into content, the input/output module provides the content to the user interface, and the user interface displays the received content to the user.

Further to these embodiments, the content processing module then generates a second command data comprising instructions to begin operating the eye-tracking sensor module and provides the second command data to the eye-tracking module. The eye-tracking module receives the second command data, processes into a first hardware operation data, and provides the first hardware operation data to the eye-tracking sensor. The eye-tracking sensor module then begins to track the movements of the eyes of the user in order to generate ocular sensor data. The content processing module additionally generates a third command data comprising instructions to begin operating the expression sensor module, and provides the third command data to the expression processing module. The expression processing module receives the third command data, processes it to generate a second hardware operation data, and provides the second hardware operation data to the expression sensor module. The expression sensor module then begins to track the micro-expressions of the user in order to generate expression sensor data. The eye-tracking sensor module and the expression sensor module then track the gaze and expressions of the user as user interface presents the content to the user. The eye-tracking sensor module then provides ocular sensor data to the eye-tracking module, and the expression sensor module then provides expression sensor data to the expression processing module. The eye-tracking module receives the ocular sensor data, processes it to generate ocular engagement data, and provides the ocular engagement data to the content processing module. Additionally, the expression processing module receives the expression sensor data, processes it to generate emotional state data, and provides the emotional state data to the content processing module. The content processing module receives the ocular engagement data and the emotional state data and processes it to determine that the user requires supplemental content. The content processing module then determines that one or more portions of the supplemental content are stored as supplemental internal data within a storage device associated with the user device, and one or more other portions not stored within said storage device may be stored as supplemental external data within the external data source. The content processing module proceeds to generate a fourth command data comprising a request for supplemental external data, and provides the fourth command data to the communication module. The communication module receives the fourth command data, generates a second query data, and provides the second query data to the external data source. The external data source receives the second query data, processes it to generate a second result data, and provides the second result data to the communication module. The communication module receives the second result data, processes the second result data to generate supplemental external data, and provides the supplemental external data to the content processing module. The content processing module then receives the supplemental external data, retrieves the supplemental internal data from the storage device associated with the user device, and processes the external content data and supplemental internal data to generate a second output data. The content processing module then provides the second output data to the input/output module, the input/output module processes the second output data into content, the input/output module provides the content to the user interface, and the user interface displays the received content to the user.

In other embodiments, systems and methods for presenting supplemental content to a user comprise a user device, an external data source, a first communications network, a second communications network, and a server. In these embodiments, the user device comprises a user device communication module, an input/output module, a user interface, an eye-tracking sensor, and an expression sensor module. Further to these embodiments, the server comprises a server communication module, an eye-tracking module, an expression processing module, authentication module, and content processing module.

In these embodiments, the user operates the user device via the user interface. The user interface receives a first input comprising credentials associated with the user, processes the first input into first input data, and provides the first input data to the input/output module. The input/output module then processes the first input data into credential data, and provides the credential data to the user device communication module. The user device communication module then provides the credential data to the server communication module within the server, and the server communication module provides the credential data to the authentication module. The authentication module then verifies that the user is authorized to operate the user device. The user then operates the user device and provides a second input comprising a request that content (e.g., a specified RSVP text) be displayed on the user device via the user interface. The user interface receives the second input, generates second input data, and provides the second input data to the input/output module. The input/output module then generates user instruction data and provides the user instruction data to the user device communication module. The user device communication module then provides the user instruction data to the server communication module, and the server communication module provides the user instruction data to the content processing module. The content processing module then processes the user instruction data and determines that one or more portions of the requested content are stored as internal content data within a storage device and/or memory associated with the server, and one or more other portions not stored within said storage device may be stored as external content data within the external data source. The content processing module proceeds to generate a first command data comprising a request for external content data, and provides the first command data to the server communication module. The server communication module receives the first command data, generates a first query data, and provides the first query data to the external data source. The external data source receives the first query data, processes it to generate a first result data, and provides the first result data to the server communication module. The server communication module receives the first result data, processes the first result data to generate external content data, and provides the data to the content processing module. The content processing module then receives the external content data, retrieves the internal content data from the storage device associated with the server, and processes the external content data and internal content data to generate a first output data. The content processing module then provides the first output data to the server communication module. The server communication module receives the first output data, the server communication module provides the first output data to the user device communication module, and the user device communication module provides the first output data to the input/output module, the input/output module processes the first output data into content, the input/output module provides the content to the user interface, and the user interface displays the received content to the user.

Further to these embodiments, the content processing module then generates a second command data comprising instructions to begin operating the eye-tracking sensor module and provides the second command data to the eye-tracking module. The eye-tracking module receives the second command data, processes into a first hardware operation data, and provides the first hardware operation data to the server communication module. The server communication module then provides the first hardware operation data to the user device communication module, the user device communication module provides the first hardware operation data to the eye-tracking sensor, and the eye-tracking sensor module begins to track the movements of the eyes of the user in order to generate ocular sensor data. The content processing module additionally generates a third command data comprising instructions to begin operating the expression sensor module, and provides the third command data to the expression processing module. The expression processing module receives the third command data, processes it to generate a second hardware operation data, and provides the second hardware operation data to the server communication module. The server communication module then provides the second hardware operation data to the user device communication module, the user device communication module provides the second hardware operation data to the expression sensor module, and the expression sensor module begins to track the micro-expressions of the user in order to generate expression sensor data.

The eye-tracking sensor module and the expression sensor module then track the gaze and expressions of the user as the user interface presents the content to the user. The eye-tracking sensor module provides ocular sensor data to the user device communication module, the user device communication module provides the ocular sensor data to the server communication module, and the server communication module provides the ocular sensor data to the eye-tracking module. The expression sensor module provides the expression sensor data to the user device communication module, the user device communication module provides the expression sensor data to the server communication module, and the server communication module provides the expression sensor data to the expression processing module. The eye-tracking module receives the ocular sensor data, processes it to generate ocular engagement data, and provides the ocular engagement data to the content processing module. Additionally, the expression processing module receives the expression sensor data, processes it to generate emotional state data, and provides the emotional state data to the content processing module. The content processing module receives the ocular engagement data and the emotional state data and processes it to determine that the user requires supplemental content. The content processing module then determines that one or more portions of the supplemental content are stored as supplemental internal data within a storage device associated with a server, and one or more other portions not stored within said storage device may be stored as supplemental external data within the external data source. The content processing module proceeds to generate a fourth command data comprising a request for supplemental external data, and provides the fourth command data to the server communication module. The server communication module receives the fourth command data, generates a second query data, and provides the second query data to the external data source. The external data source receives the second query data, processes it to generate a second result data, and provides the second result data to the server communication module. The server communication module receives the second result data, processes the second result data to generate supplemental external data, and provides the supplemental external data to the content processing module. The content processing module then receives the supplemental external data, retrieves the supplemental internal data from the storage device associated with the server, and processes the external content data and supplemental internal data to generate a second output data. The content processing module then provides the second output data to the server communication module, the server communication module provides the second output data to the user device communication module, and the user device communication module provides the second output data to the input/output module. The input/output module then processes the second output data into content, the input/output module provides the content to the user interface, and the user interface displays the received content to the user.

Disclosed here are exemplary embodiments comprising displaying RSVP text to a user via a user device. In these embodiments, the user device is configured to track the gaze and emotions of the user, and display supplemental content when the user device detects that the user is disengaged with the content. In other exemplary embodiments disclosed herein, a user device presents content to a user and supplemental content is displayed on a pop-up when the gaze of the user remains fixed on an area of the content being displayed. In yet other exemplary embodiments, a user device presents a form to a user, and the user device is configured to perform actions on the form based on the gaze and expression of the user.

Disclosed here are methods of presenting supplemental content to a user, comprising the steps of powering on a user device, authorizing the user, and receiving input comprising a request for content from the user. The process then proceeds to retrieve content, and may then display the content until a user wishes to stop consuming content. The process may additionally activate an eye-tracking sensor module and an expression sensor module, track the gaze and expressions of the user, and determine if supplemental content is required. If supplemental content is required, the process may continue to retrieve content (comprising supplemental content) and display the content. The methods disclosed herein comprise a plurality of steps/executable instructions stored within a computer readable storage medium which, when called, are executed by a processing unit, such as, for example a server, a central processor, and the like.

In one embodiment, a method comprises generating, by a content processing module of a server, a rapid serial visual presentation using a first output data for display on a user interface of a computing device; upon generating the rapid serial visual presentation using the first output data for display on the user interface: generating, by the content processing module of the server, command data to initiate an eye tracking sensor module of the server configured to track movement of at least one eye and generate ocular sensor data; and generating, by the content processing module of the server, command data to initiate an expression sensor module configured to track micro-expressions and generate expression sensor data; presenting, by the content processing module of the server, the first output data while the eye tracking sensor module is generating ocular sensor data and the expression sensor module is generating expression sensor data; generating, by the content processing module of the server, ocular engagement data based on received ocular sensor data and state data based on received expression sensor data, and associating the ocular engagement data and the state data with a portion of the first output data that is presented on the user interface when the ocular sensor data and the expression sensor data is received; determining, by the content processing module of the server, a state of the user based on the received expression sensor data and the ocular engagement data; when the state of a user is determined to be a first state, generating, by the content processing module of the server, supplemental content data for the portion of the first output data that is associated with the first state of the user; and when the state of the user is determined to be a second state, presenting, by the content processing module of the server, a next portion of the first output data; and determining, by the content processing module of the server, whether ocular sensor data represents a value that satisfies a threshold value; when the value satisfies the threshold value, generating, by the content processing module of the server, supplemental content data for the portion of the first output data that is associated with the value of the ocular sensor data; and when the value does not satisfy the threshold value, presenting, by the content processing module of the server, a next portion of the first output data.

In another embodiment, a method comprises generating, by a content processing module of a server, a rapid serial visual presentation using a first output data for display on a user interface of a computing device; upon generating the rapid serial visual presentation using the first output data for display on the user interface: generating, by the content processing module of the server, command data to initiate an eye tracking sensor module of the server configured to track movement of at least one eye and generate ocular sensor data; presenting, by the content processing module of the server, the first output data while the expression sensor module is generating expression sensor data; generating, by the content processing module of the server, state data based on received expression sensor data, and associating the state data with a portion of the first output data that is presented on the user interface when the expression sensor data is received; and determining, by the content processing module of the server, a state of the user based on the received expression sensor data; when the state of a user is determined to be a first state, generating, by the content processing module of the server, supplemental content data for the portion of the first output data that is associated with the first state of the user; and when the state of the user is determined to be a second state, presenting, by the content processing module of the server, a next portion of the first output data.

In yet another embodiment, a method comprises generating, by a content processing module of a server, a rapid serial visual presentation using a first output data for display on a user interface of a computing device; upon generating the rapid serial visual presentation using the first output data for display on the user interface, generating, by the content processing module of the server, command data to initiate an eye tracking sensor module of the server configured to track movement of at least one eye and generate ocular sensor data; presenting, by the content processing module of the server, the first output data while the eye tracking sensor module is generating ocular sensor data; generating, by the content processing module of the server, ocular engagement data based on received ocular sensor data, and associating the ocular engagement data with a portion of the first output data that is presented on the user interface when the ocular sensor data is received; and determining, by the content processing module of the server, whether ocular engagement data represents a value that satisfies a threshold value; when the value satisfies the threshold value, generating, by the content processing module of the server, supplemental content data for the portion of the first output data that is associated with the value of the ocular engagement data; and when the value does not satisfy the threshold value, presenting, by the content processing module of the server, a next portion of the first output data according to the rapid serial visual presentation.

In one embodiment, a method comprises generating, by a content processing module of a server, a graphical user interface on a display of a user computing device, wherein the graphical user interface comprises fields configured to receive inputs from the user computing device and the content processing module generates instructions to store those inputs in a database; generating, by the content processing module of the server, command data to initiate an eye tracking sensor module of the server configured to track movement of at least one eye and generate ocular sensor data from a user of the use computing device; presenting, by the content processing module of the server, a first field on the graphical user interface while the eye tracking sensor module is generating ocular sensor data; generating, by the content processing module of the server, ocular engagement data based on received ocular sensor data, and associating the ocular engagement data with a portion of the first field on the graphical user interface that is presented when the ocular sensor data is received; and determining, by the content processing module of the server, whether ocular engagement data represents a value that satisfies a threshold value; when the value satisfies the threshold value, generating, by the content processing module of the server, supplemental content data for the portion of the first field on the graphical user interface that is associated with the value of the ocular engagement data; and when the value does not satisfy the threshold value, presenting, by the content processing module of the server, a next field on the graphical user interface.

In another embodiment, a method comprises generating, by a content processing module of a server, a graphical user interface on a display of a user computing device, wherein the graphical user interface comprises fields configured to receive inputs from the user computing device and the content processing module generates instructions to store those inputs in a database; generating, by the content processing module of the server, command data to initiate an expression sensor module configured to track micro-expressions and generate expression sensor data; presenting, by the content processing module of the server, first field on the graphical user interface while the expression sensor module is generating expression sensor data; generating, by the content processing module of the server, state data based on received expression sensor data, and associating the state data with a portion of the first field on the graphical user interface that is presented when the expression sensor data is received; and determining, by the content processing module of the server, a state of the user based on the received expression sensor data; when the state of a user is determined to be a first state, generating, by the content processing module of the server, supplemental content data for the portion of the first output data that is associated with the first state of the user; and when the state of the user is determined to be a second state, presenting, by the content processing module of the server, a next field on the graphical user interface.

Numerous other aspects, features and benefits of the present disclosure may be made apparent from the following detailed description taken together with the drawing figures.

BRIEF DESCRIPTION OF THE DRAWINGS

The present disclosure is herein described with reference to embodiments illustrated in the drawings. Other embodiments may be used and/or other changes may be made without departing from the spirit or scope of the present disclosure. The illustrative embodiments described in the brief description are not meant to be limiting of the subject matter presented herein.

DETAILED DESCRIPTION

Figure 1:
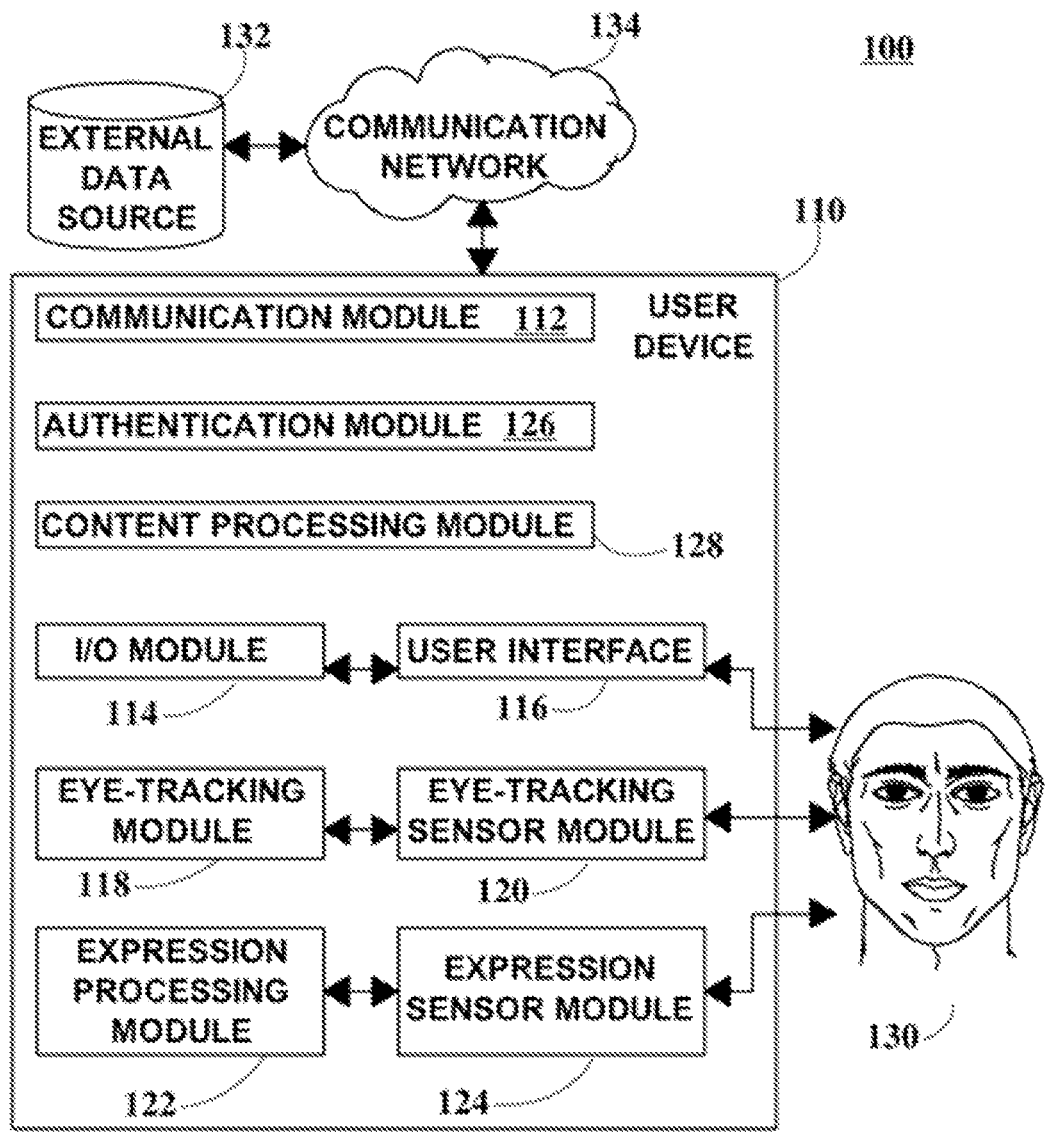
FIG. 1 is a functional block diagram illustrating a system architecture for presenting supplemental content to a user based on ocular and expressive feedback, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Systems and methods for presenting supplemental content based on ocular and expressive feedback are disclosed. The methods may comprise displaying content to a user, tracking the gaze and expression of the user to generate ocular engagement data and emotional state data, and determining if supplemental content is needed based on the ocular engagement data and emotional state data.

The disclosed methods may be implemented by a user interacting with computer systems. In some embodiments, the computer systems may comprise a user device, a server, and an external data source. In these embodiments, the user device includes eye-tracking capabilities and expression tracking capabilities. Further to these embodiments, the user device, server, and external data source may communicate using any network infrastructure. Examples of computing devices may include personal computers, tablet devices, and mobile phones, amongst others. Examples of network infrastructures may include intranets, local area networks (LAN), virtual private networks (VPN), wireless area networks (WAN) and the World Wide Web, amongst others.

FIG. 1 is a functional block diagram illustrating a system architecture for presenting supplemental content to a user based on ocular and expressive feedback, according to an embodiment. In FIG. 1, system architecture 100 includes user device 110, external data source 132, and communications network 134. In FIG. 1, user device 110 includes communication module 112, input/output module 114, user interface 116, eye-tracking module 118, eye-tracking sensor module 120, expression processing module 122, expression sensor module 124, authentication module 126, and content processing module 128, and user 130 interacts with and uses system architecture 100. In FIG. 1, user device 110 is operably coupled to and in bi-directional communication with external data source 132 via communications network 134. In some embodiments, user interface 116, eye-tracking sensor module 120, and expression sensor module 124 are configured to operate with associated hardware (not shown, but described in FIG. 3, below) to interact with user 130. In other embodiments, system architecture 100 can include additional, fewer, or differently arranged components than those illustrated in FIG. 1. In yet other embodiments, components within system architecture 100 may be implemented on any type of suitable processor-controlled device that receives, processes, and/or transmits digital data, and is configured as further described in FIG. 3, below. Examples of devices incorporating one or more suitable processor-controlled devices for running software for presenting content based on ocular and expressive feedback include smartphones, desktop computers, laptop computers, servers, tablets, PDAs, and the like.

In some embodiments, user device 110 is implemented as a computing device including hardware and/or software modules configured to authenticate user 130, receive a request for content from user 130, retrieve external content data and/or supplemental external data from external data source 132, process the received external content data and/or supplemental external data to produce content, display content to user 130, and track and characterize the gaze and/or expression of user 130. In these embodiments, user 130 is an end-user of user device 110 that provides input to user device 110 in order to consume content. In an example, user 130 is an agent wishing to read reference information regarding one or more products offered by the company employing the agent.

Figure 3:
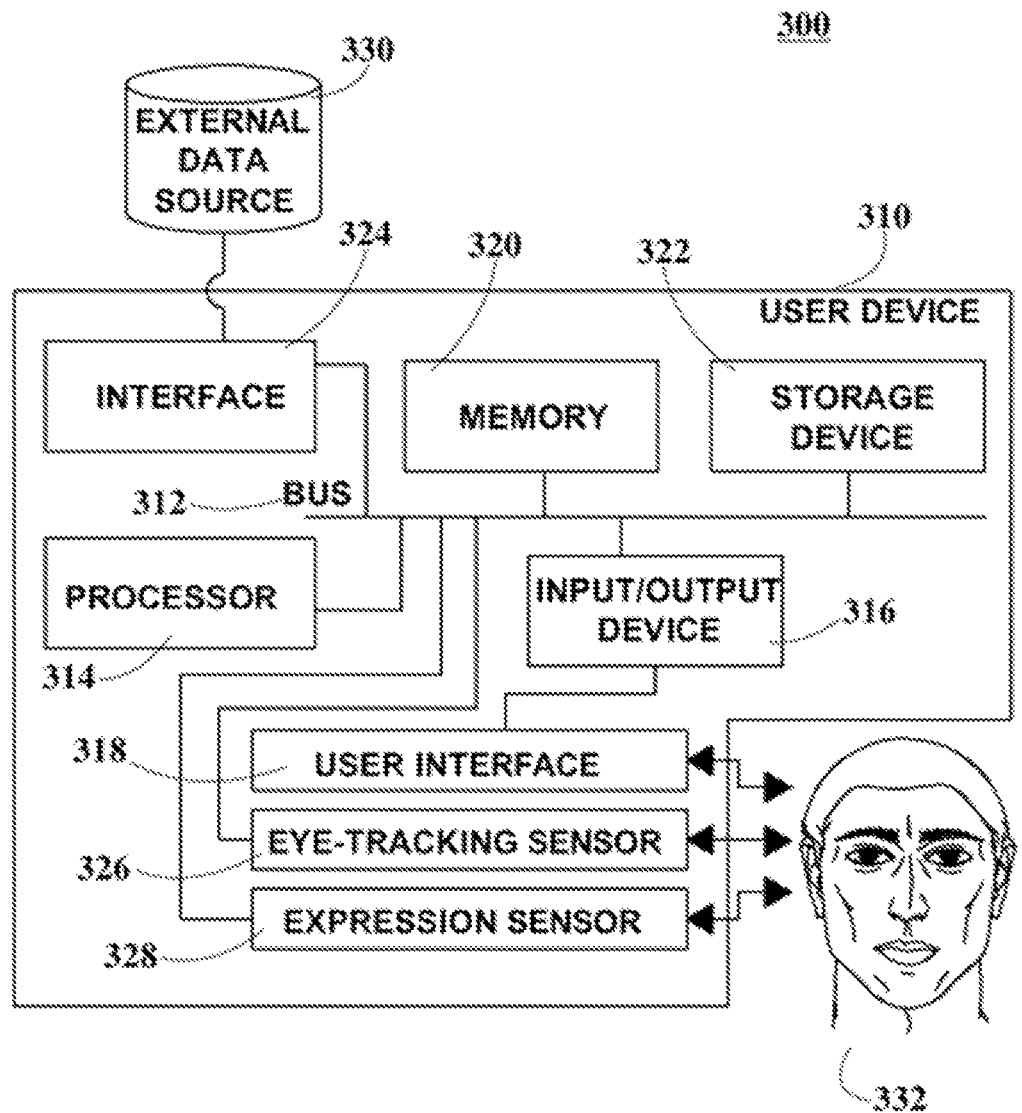
FIG. 3 is functional block diagram illustrating exemplary system hardware for presenting supplemental content to a user based on ocular and expressive feedback, according to an embodiment.

In some embodiments, communication module 112 is implemented as a software module running on associated hardware, further detailed in FIG. 3, that is configured to receive command data from content processing module 128, process the received command data to produce query data, provide the query data to an external data source 132, receive result data from external data source 132, process the received result data into data, and provide the external content data to content processing module 128. In other embodiments, communication module 112 is further configured to process the received result data into external supplemental data and to provide the external supplemental data to content processing module 128. In some embodiments, communication module 112 sends and receives data via a wired or wireless connection using a desired protocol (e.g., TCP/IP, HTTP, UDP, IMAP, and the like).

In some embodiments, query data includes requests for external content data contained within command data. In an example, query data includes a request for one or more portions of text associated with a policy/contract, company guideline, and the like. In these embodiments, external content data includes text and/or media (e.g., RSVP text, images, audio, video, and the like), status messages (e.g., server down, information not found, a listing of potential matches, and the like), or the like. In other embodiments, query data includes requests for supplemental data specified within command data. In these embodiments, query data includes a request for a definition of one or more terms in text previously presented to user 130, a request for media associated with the one or more terms, and the like. In an example, query data includes a request for the term "beneficiary," which has been previously presented to user 130 employing RSVP of the associated text.

RSVP content can be displayed on a user interface in a continuous manner, such that about 10 items (e.g., words, phrases, figures, images, pictures, sentences, phrases) are presented per second. Each item is presented in the same position on the screen. A first portion of the content can comprise an item or a set of items, whereby a set of items can comprise a phrase, a sentence, a description, or the like. After a first portion of the content is displayed, a second portion can be displayed. If the system detects that the user has a state of discontent, confusion, unhappiness, etc., the system can display supplemental content related to that portion of the content. If the system detects that the user is focusing for a period on an item or has been looking away, the system can display supplemental content related to that portion to present content that may be easier to understand or more interesting.

In other embodiments, input/output module 114 is implemented as a software module running on associated hardware, further detailed in FIG. 3, and configured to receive input data from user interface 116, to process the received input data into instruction data, and to provide the instruction data to content processing module 128. In these embodiments, input/output module 114 is further configured to receive output data from content processing module 128, process the received output data to generate content, and provide the generated content to user interface 116. In other embodiments, input/output module 114 is configured to receive input data from user interface 116, to process the received input data into credential data, and to provide the credential data to authentication module 126.

In some embodiments, instruction data includes one or more of requests for content, instructions associated with the requests for content, actions associated with content being displayed by user device 110, and the like. In an example, instruction data includes requests for a specified text (e.g., a section of a contract and the like), settings associated with the display of said text (e.g., words per minute to display in a RSVP text reader, and the like), and/or commands associated with the specified text (e.g., pausing the displayed text, resuming the displayed text, scrolling through the text, and the like). In other embodiments, instruction data includes credentials associated with user 130, such as a username and password, biometric credentials, and the like. In yet other embodiments, content includes one or more of text and/or media (e.g., RSVP text, paragraph text, images, video, audio, and the like) and/or instructions for presenting the text and/or media (e.g., layout, RSVP speed, and the like).

In some embodiments, user interface 116 is implemented as a software module running on associated hardware, further detailed in FIG. 3, and configured to receive input from user 130, processes the received input into input data, provides the input data to input/output module 114, receives content from input/output module 114, and displays content to user 130. In these embodiments, input data includes user requests to display a desired set of content, user instructions associated with the display of content (e.g., pausing, rewinding, or skipping forward in media), credentials for authorizing a session on user device 110, and the like.

In some embodiments, eye-tracking module 118 is implemented as a software module running on associated hardware, further detailed in FIG. 3, and configured to receive command data from content processing module 128, processes the command data into hardware operation data, and provides the hardware operation data to eye-tracking sensor module 120. In these embodiments, eye-tracking module 118 is further configured to receive ocular sensor data from eye-tracking sensor module 120, processes the ocular sensor data to generate ocular engagement data, and provides the ocular engagement data to content processing module 128. Further to these embodiments, ocular engagement data includes one or more metrics characterizing the level of engagement of user 130 with content being displayed via user interface 116. In an example, the ocular engagement data includes data describing whether or not the gaze of User 130 is directed toward the content displayed via user interface 116, a general level of interest in the content displayed via user interface 116 as determined by the eye movements of user 130, and the like. In these embodiments, hardware operation data includes instructions for hardware operation, such as instructions to activate eye-tracking sensors, to begin to track the gaze of User 130, to stop tracking the gaze of user 130, and the like.

In some embodiments, eye-tracking sensor module 120 is implemented as software configured to control associated hardware, further detailed in FIG. 3, and configured to receive hardware operation data from eye-tracking module 118, interact with user 130 in order to generate ocular sensor data, and provide the ocular sensor data to eye-tracking module 118. In these embodiments, ocular sensor data includes data describing the movement of the eyes of user 130. In an example, eye-tracking sensor module 120 is implemented as software configured to control camera hardware (e.g., a camera pair, not shown) included within user device 110 that is configured to determine the direction of the gaze of user 130. In this example, ocular sensor data includes the length of stare of user 130 on one or more regions of content being displayed via user interface 116, whether or not user 130 is looking at one or more portions of content being displayed via user interface 116, and the path of the gaze of user 130 as user 130 views content being displayed via user interface 116.

Eye tracking module 118 may utilize sensor or camera data to determine the gaze of a user. In one embodiment, a light (e.g., infrared) is reflected from the user's eye and a video camera or other sensor can receive the corneal reflection. The eye tracking module 118 analyzes the ocular sensor data to determine eye rotation from a change in the light reflection. A vector between a pupil center and the corneal reflections can be used to compute a gaze direction. Eye movement data may be based upon a saccade and/or a fixation, which may alternate. A fixation is generally maintaining a visual gaze on a single location, and it can be a point between any two saccades. A saccade is generally a simultaneous movement of both eyes between two phases of fixation in the same direction.

In one implementation, the eye tracking module can use a dark-pupil technique, whereby if the illumination source is offset from the optical path, then the pupil appears dark as the retroreflection from the retina is directed away from the camera. In another implementation, the eye tracking module can use a bright-pupil technique, whereby if the illumination is coaxial with the optical path, then the eye acts as a retroreflector as the light reflects off the retina creating a bright pupil effect.

In another embodiment, a camera or sensor can track eye image features (e.g., retinal blood vessels) and follow the features as the eye rotates. It is preferable that the eye tracking data is obtained in a manner that is non-invasive.

In yet another embodiment, a camera or sensor can identify a location of an iris or pupil based on the circular shape or by detection an edge. The movement of the iris or pupil can then be detected.

In some embodiments, expression processing module 122 is implemented as a software module running on associated hardware, further detailed in FIG. 3, and configured to receive command data from content processing module 128, process the command data into hardware operation data, and provide the hardware operation data to expression sensor module 124. In these embodiments, expression processing module 122 is further configured to receive expression sensor data from expression sensor module 124, process the expression sensor data to generate emotional state data, and provide the emotional state data to content processing module 128. The expression sensor data represents a micro-expression of the user, which can be a brief, involuntary facial expression that is shown on the user's face while the user is experiencing the emotion.

Further to these embodiments, emotional state data can be processed to generate data describing the emotional state of user 130. In an example, emotional state data describes whether or not user 130 is confused by content being displayed via user interface 116. In this example, the emotional state data can be generated by implementing methods similar to those described in Chiu, Mei-Hung, et al. "The role of facial microexpression state (FMES) change in the process of conceptual conflict." *British Journal of dcaitiona Technology* 45.3 (2014): 471-486. In these embodiments, hardware operation data includes instructions for hardware operation, such as instructions to activate expression sensors, to begin to track the expression of user 130, to stop tracking the expression of user 130, and the like.

In some embodiments, expression sensor module 124 is implemented as software configured to control associated hardware, further detailed in FIG. 3, and configured to receive hardware operation data from expression processing module 122, interact with user 130 in order to generate expression sensor data, and provide the expression sensor data to expression processing module 122. In these embodiments, expression sensor data includes data describing micro-expressions of user 130 (e.g., expression skeletons describing facial states, and the like). In an example, expression sensor module 124 is implemented as software configured to control a camera, not shown, included within user device 110 that is configured to detect the micro-expressions of user 130. In this example, expression sensor data includes images of user 130 as user 130 views content displayed via user interface 116.

The expression processing module 122 can use a facial action coding system that recognizes changes in a facial expression and generates a score based on duration, intensity, and asymmetry. Facial expressions may have a duration of about $\frac{1}{25}$ to $\frac{1}{15}$ of a second, so the expression processing module 122 will receive a data feed of facial movements from a high speed camera having increments of less than one second to account for very quick changes. Some micro-expressions occur so quickly that a human observer cannot detect or sense the expression. In one embodiment, the expression processing module may require a threshold amount of time that a user holds a particular expression (e.g., $\frac{1}{25}$ second, $\frac{1}{4}$ second, $\frac{1}{3}$ second, 12 second) before adjusting content in view of that expression. In order to capture only micro-expressions, the expression processing module may also include a threshold of a maximum amount of time for that particular expression (e.g., $\frac{1}{2}$ second, $\frac{2}{3}$ second, $\frac{3}{4}$ second, 1 second, 1.5 seconds). In an alternative embodiment, the expression processing module is not limited to only micro-expressions.

In one example, the expression processing module may receive data from a camera or other sensor and process the data to determine that the user is in a state of disgust based on the expression sensor data. Data that may be relevant to determining the state of disgust can include data that represents that the user has raised an upper lid, raised a lower lip, wrinkled the nose, raised cheeks, and/or lines below the lower lid. In another example, a state of anger may be associated with a profile having data that represents lowered eyebrows, a wrinkled forehead, tensed eyelids, and tensed lips. A file containing a set of profiles, which may be stored in a database (not shown) associated with the server 240, may be used to match the expression sensor data by converting the data to generate action unit scores of the facial action coding system and then determining a similarity to any stored profiles.

Upon receiving this data, the expression processing module compares this data to stored profiles and can determine that this data matches a profile of disgust. Based on this determined profile, the system may generate additional content based on the content that was being viewed in association with this state. The additional content may be stored in a database and tagged with a particular state, such that if the user is disgusted with a price, additional content can be displayed that justifies the price or offers alternative pricing schemes.

In some embodiments, authentication module 126 is implemented as a software module running on associated hardware, further detailed in FIG. 3, and configured to receive credential data from input/output module 114 and processes the received credential data to determine whether user 130 is authorized to operate user device 110. In these embodiments, authentication module 126 may compare the received credential data to previously entered credential data, which is stored within a storage device within user device 110, associated with authorized use.

In some embodiments, content processing module 128 is implemented as a software module running on associated hardware, further detailed in FIG. 3, and configured to receive user instruction data from input/output module 114, receive ocular engagement data from eye-tracking module 118, receive emotional state data from expression processing module 122, process one or more of the received user instruction data, ocular engagement data, and/or emotional state data to generate command data, and to provide the command data to one or more of communication module 112, eye-tracking module 118, and/or expression processing module 122. In these embodiments, content processing module 128 is further configured to receive external content data from communication module 112, to retrieve internal content data from a storage device associated with user device 110 (further detailed in FIG. 3), and process said external content data and internal content data to generate output data. Further to these embodiments, content processing module 128 is configured to receive supplemental external data from communication module 112, to retrieve supplemental internal data from the storage device associated with user device 110, and process the supplemental external data and the supplemental internal data to generate output data.

In some embodiments, command data includes instructions for a communications module to retrieve data specified within user instruction data. In an example, command data includes instructions associated with communication module 112 for it to generate a desired query data. In this example, the instructions include request for specific content information. In these embodiments, command data includes instructions for eye-tracking module 118 and expression processing module 122 to begin operation. Further to these embodiments, internal content data includes text, images, and other media stored within a storage device associated with user device 110. In these embodiments, supplemental internal data includes text, images, and other media that is supplemental to content previously presented to user 130. Still further to these embodiments, output data includes text, images, video, and layout information. In an example, output data includes RSVP text to be presented to user 130.

In some embodiments, external data source 132 is implemented as a data source configured to receive query data from communication module 112, process the query data to generate result data, and provide the result data to communication module 112. In these embodiments, external data source 132 is implemented as a database that includes content information, such as for example images, text (e.g., books, articles, encyclopedia entries, blog posts, and the like), videos, metadata (e.g., relationships between images, texts, videos, and the like), and the like. In an example, external data source 132 is a database including company guidelines, sample policies, explanations of said policies, a glossary of terms associated with said policies, metadata about the relationship between the terms within the glossary of terms and one or more sample policies, and the like. In other embodiments, external data source 132 is implemented as a third party information source, such as an online encyclopedia, image server, video server, dictionary, and the like. In these embodiments, external data source 132 may be implemented as a database management system (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database (MDB), and the like.

In operation, user 130 operates user device 110 via user interface 116. In some embodiments, user interface 116 receives a first input including credentials associated with user 130, processes the first input into first input data, and provides the first input data to input/output module 114. In these embodiments, input/output module 114 processes the first input data into credential data and provides the credential data to authentication module 126, and authentication module 126 verifies that user 130 is authorized to operate user device 110. Further to these embodiments, user 130 then operates user device 110 and provides a second input including a request that content (e.g., a specific RSVP text) be displayed on user device 110 via user interface 116. In these embodiments, user interface 116 receives the second input, generates second input data, and provides the second input data to input/output module 114. Still further to these embodiments, input/output module 114 generates user instruction data and provides the user instruction data to content processing module 128. In these embodiments, content processing module 128 processes the user instruction data and determines that one or more portions of the requested content are stored as internal content data within a storage device associated with user device 110, and further determines that one or more other portions not stored within said storage device may be stored as external content data within external data source 132. Still further to these embodiments, content processing module 128 generates a first command data including a request for external content data, and provides the first command data to communication module 112. In these embodiments, communication module 112 receives the first command data, generates a first query data, and provides the first query data to external data source 132. Yet further to these embodiments, external data source 132 receives the first query data, processes it to generate a first result data, and provides the first result data to communication module 112. In these embodiments, communication module 112 receives the first result data, processes the first result data to generate external content data, and provides the external content data to content processing module 128. Yet still further to these embodiment, content processing module 128 receives the external content data, retrieves the internal content data from the storage device associated with user device 110, and processes the external content data and internal content data to generate a first output data. In these embodiments, content processing module 128 provides the first output data to input/output module 114, input/output module 114 processes the first output data into content, input/output module 114 provides the content to user interface 116, and user interface 116 displays the received content to user 130.

In some embodiments, content processing module 128 generates a second command data including instructions to begin operating eye-tracking sensor module 120 and provides the second command data to eye-tracking module 118. In these embodiments, eye-tracking module 118 receives the second command data, processes into a first hardware operation data, and provides the first hardware operation data to eye-tracking sensor module 120. Further to these embodiments, eye-tracking sensor module 120 begins to track the movements of the eyes of user 130 in order to generate ocular sensor data. In these embodiments, content processing module 128 additionally generates a third command data including instructions to begin operating expression sensor module 124, and provides the third command data to expression processing module 122. Still further to these embodiments, expression processing module 122 receives the third command data, processes it to generate a second hardware operation data, and provides the second hardware operation data to expression sensor module 124. In these embodiments, expression sensor module 124 begins to track the micro-expressions of user 130 in order to generate expression sensor data. Yet further to these embodiments, eye-tracking sensor module 120 and expression sensor module 124 track the gaze and expressions of user 130 as user interface 116 presents the content to user 130. In these embodiments, eye-tracking sensor module 120 then provides ocular sensor data to eye-tracking module 118, and expression sensor module 124 then provides expression sensor data to expression processing module 122. Yet still further to these embodiments, eye-tracking module 118 receives the ocular sensor data, processes it to generate ocular engagement data, and provides the ocular engagement data to content processing module 128. In these embodiments, expression processing module 122 receives the expression sensor data, processes it to generate emotional state data, and provides the emotional state data to content processing module 128. Further to these embodiments, content processing module 128 receives the ocular engagement data and the emotional state data and processes it to determine that user 130 requires supplemental content. In these embodiments, content processing module 128 then determines that one or more portions of the supplemental content are stored as supplemental internal data within a storage device associated with user device 110, and one or more other portions not stored within said storage device may be stored as supplemental external data within external data source 132. Still further these embodiments, content processing module 128 proceeds to generate a fourth command data including a request for supplemental external data, and provides the fourth command data to communication module 112. In these embodiments, communication module 112 receives the fourth command data, generates a second query data, and provides the second query data to external data source 132. Yet further to these embodiments, External Data Source 132 receives the second query data, processes it to generate a second result data, and provides the second result data to communication module 112. In these embodiments, communication module 112 receives the second result data, processes the second result data to generate supplemental external data, and provides the supplemental external data to content processing module 128. Still yet further to these embodiments, content processing module 128 then receives the supplemental external data, retrieves the supplemental internal data from the storage device associated with user device 110, and processes the external content data and supplemental internal data to generate a second output data. In these embodiments, content processing module 128 then provides the second output data to input/output module 114, input/output module 114 processes the second output data into content, input/output module 114 provides the content to user interface 116, and user interface 116 displays the received content to user 130.

Figure 2:
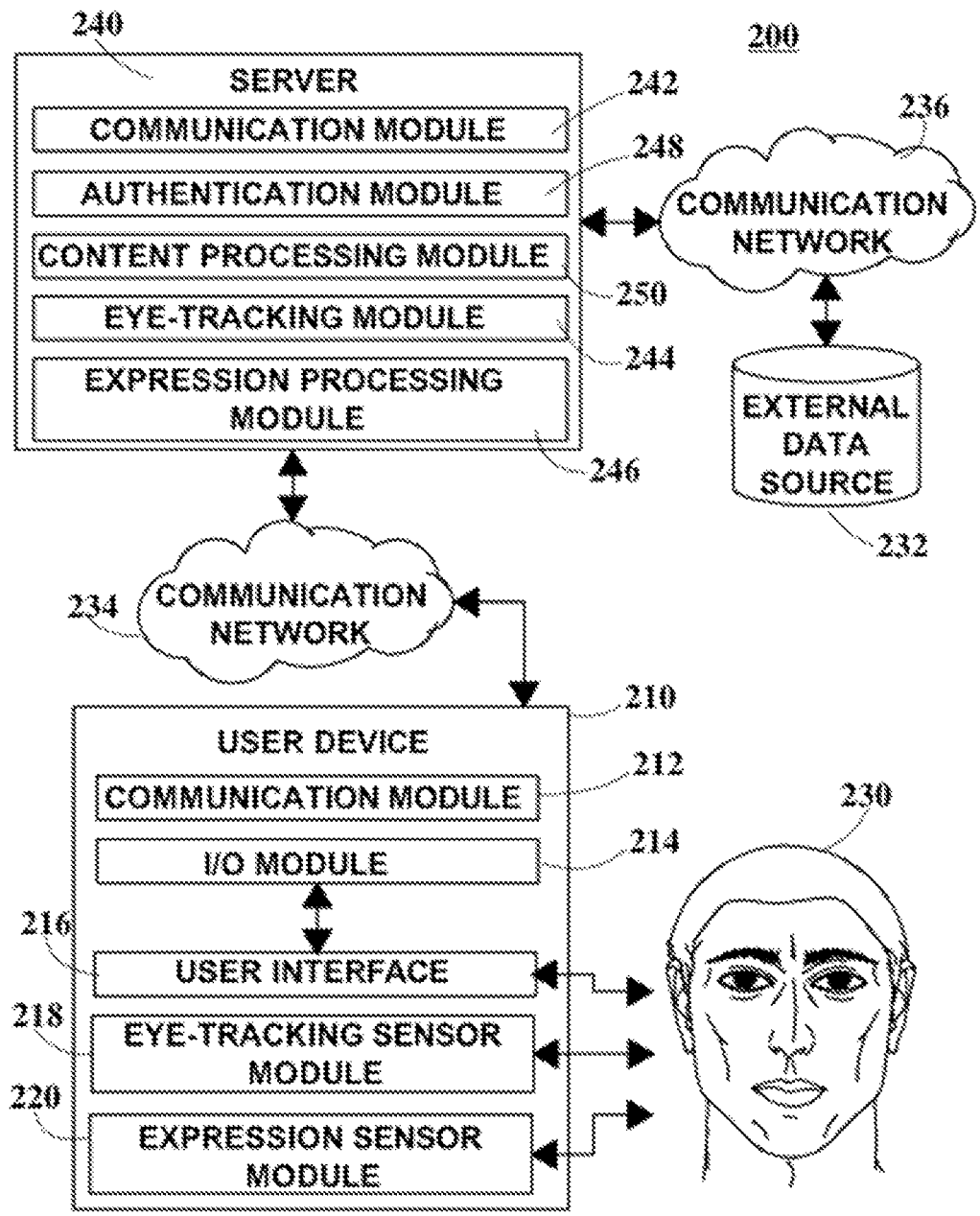
FIG. 2 is a functional block diagram illustrating a system architecture for presenting supplemental content to a user based on ocular and expressive feedback, according to another embodiment.

FIG. 2 is a functional block diagram illustrating a system architecture for presenting supplemental content to a user based on ocular and expressive feedback, according to another embodiment. In FIG. 2, system architecture 200 includes user device 210, user 230, external data source 232, first communications network 234, second communications network 236, and server 240. In some embodiments, user device 210 includes user device communication module 212, input/output module 214, user interface 216, eye-tracking sensor module 218, and expression sensor module 220. In FIG. 2, server 240 includes server communication module 242, eye-tracking module 244, expression Processing Module 246, Authentication Module 248, and Content Processing Module 250.

In some embodiments, user device 210 is operably coupled to and in bi-directional communication with server 240 via first communications network 234, and server 240 is operably coupled to and in bi-directional communication with external data source 232 via second communications network 236. In these embodiments, user interface 216, eye-tracking sensor module 218, and expression sensor module 220 are configured to operate with associated hardware (not shown, but described in FIG. 4, below) to interact with user 230. In other embodiments, system architecture 200 can include additional, fewer, or differently arranged components than those illustrated in FIG. 2. In yet other embodiments, components within system architecture 200 may be implemented on any type of suitable processor-controlled device that receives, processes, and/or transmits digital data, and is configured as further described in FIG. 4, below. Examples of devices incorporating one or more suitable processor-controlled devices for running software for presenting content based on ocular and expressive feedback include smartphones, desktop computers, laptop computers, servers, tablets, PDAs, and the like.

In some embodiments, user device 210 is implemented as a computing device including hardware and/or software modules configured to receive input (e.g., a request for content, user credentials, and the like) from user 230, receive hardware operation data from server 240, provide data (e.g., user instruction data, ocular sensor data, expression sensor data, and the like) to server 240, and receive output data from server 240, and to display content to user 230. In these embodiments, server 240 is implemented as a computing device including hardware and or software modules able to receive user instruction data, authenticate user 230, retrieve external content data and/or supplemental external data from external data source 232, process the received external content data and/or supplemental external data to produce content, and characterize the gaze and/or expression of user 230. Further to these embodiments, user 230 is an end-user of user device 210 that provides input to user device 210 in order to consume content. In an example, user 230 is an agent wishing to read reference information regarding one or more products offered by the company employing the agent.

Figure 4:
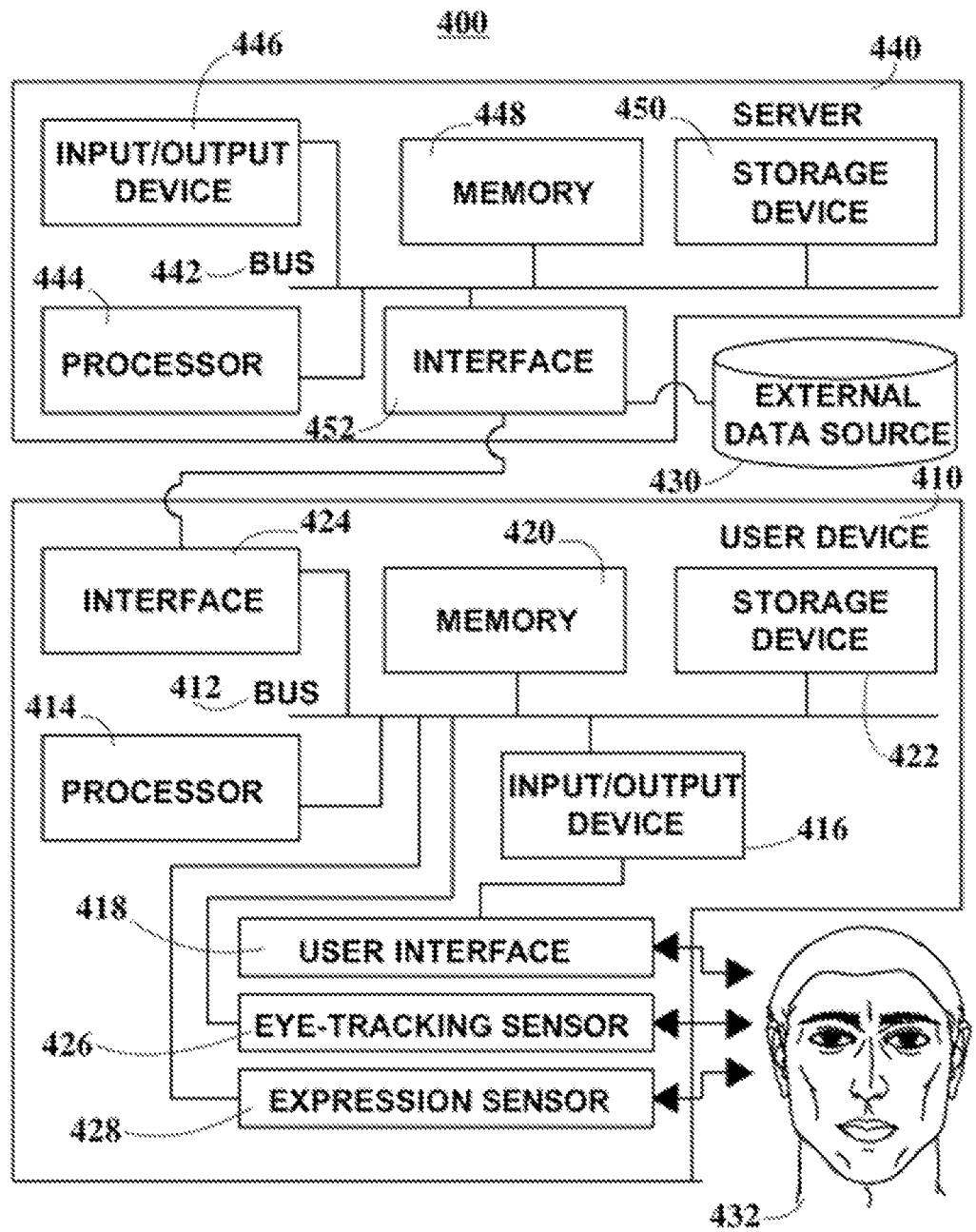
FIG. 4 is functional block diagram illustrating exemplary system hardware for presenting supplemental content to a user based on ocular and expressive feedback, according to another embodiment.

In some embodiments, user device communication module 212 is implemented as a software module running on associated hardware, further detailed in FIG. 4, configured to receive user instruction data from input/output module 214, receive credential data from input/output module 214, receive ocular sensor data from eye-tracking sensor module 218, receive expression sensor data from expression sensor module 220, and to receive one or more of output data and/or hardware operation data from server communication module 242. In these embodiments, user device communication module 212 is further configured to provide output data to input/output module 214, provide hardware operation data to eye-tracking sensor module 218, provide hardware operation data to expression sensor module 220, and provide one or more of user instruction data, credential data, ocular sensor data, and/or expression sensor data to server communication module 242. Further to these embodiments, communication module 112 sends and receives data via a wired or wireless connection using a desired protocol (e.g., TCP/IP, HTTP, UDP, IMAP, and the like).

In some embodiments, input/output module 214 is implemented as a software module running on associated hardware, further detailed in FIG. 4, and configured to receive input data from user interface 216, to process the received input data into instruction data, and to provide the instruction data to user device communication module 212. In these embodiments, input/output module 114 is further configured to receive output data from user device communication module 212, process the received output data to generate content, and provide the generated content to user interface 216. Further to these embodiments, input/output module 114 is configured to receive input data from user interface 216, to process the received input data into credential data, and to provide the credential data to user device communication module 212.

In some embodiments, user interface 216 is implemented as a software module running on associated hardware, further detailed in FIG. 4, configured to receive input from user 230, process the received input into input data, provide the input data to input/output module 214, receive content from input/output module 214, and display content to user 230. In these embodiments, input data includes user requests to display a desired set of content, user instructions associated with the display of content (e.g., pausing, rewinding, or skipping forward in media), credentials for authorizing a session on user device 210, and the like.

In some embodiments, eye-tracking sensor module 218 is implemented as software configured to control associated hardware, further detailed in FIG. 4, and configured to receive hardware operation data from user device communication module 212, interact with user 230 in order to generate ocular sensor data, and provide the ocular sensor data to user device communication module 212. In these embodiments, ocular sensor data includes data describing the movement of the eyes of user 230. In an example, eye-tracking sensor module 218 is implemented as software configured to control camera hardware (e.g., a camera pair, not shown) within user device 210 that is configured to determine the direction of the gaze of user 230. In this example, ocular sensor data includes the length of stare of user 230 on one or more regions of content being displayed via user interface 116, whether or not user 230 is looking at one or more portions of content being displayed via user interface 216, and the path of the gaze of user 230 as user 230 views content being displayed via user interface 216.

In some embodiments, expression sensor module 220 is implemented as software configured to control associated hardware, further detailed in FIG. 4, and configured to receive hardware operation data from user device communication module 212, interact with user 230 in order to generate expression sensor data, and provide the expression sensor data to user device communication module 212. In these embodiments, expression sensor data includes data describing micro-expressions of user 230. In an example, expression sensor module 220 is implemented as software configured to control a camera, not shown, within user device 210 that is configured to detect the micro-expressions of user 230. In this example, expression sensor data includes images of user 230 as user 230 views content displayed via user interface 216.

In some embodiments, server communication module 242 is implemented as a software module running on associated hardware, further detailed in FIG. 4, that is configured to receive command data from content processing module 250, processes the received command data to produce query data, provide the query data to an external data source 232, receive result data from external data source 232, processes the received result data into external content data, and provides the external content data to content processing module 250. In these embodiments, server communication module 242 is further configured to process the received result data into external supplemental data and to provide the external supplemental data to content processing module 250. Further to these embodiments, server communication module 242 is further configured to receive output data and/or hardware operation data from content processing module 250. In these embodiments, server communication module 242 is further configured to receive one or more of user instruction data, credential data, ocular sensor data, and/or expression sensor data from user device communication module 212. Still further to these embodiments, server communication module 242 is yet further configured to provide received user instruction data to content processing module 250, provide received credential data to authentication module 248, provide received ocular sensor data to eye-tracking module 244, and provide expression sensor data to expression processing module 246. in these embodiments, server communication module 242 sends and receives data via a wired or wireless connection using a desired protocol (e.g., TCP/IP, HTTP, UDP, IMAP, and the like).

In some embodiments, eye-tracking module 244 is implemented as a software module running on associated hardware, further detailed in FIG. 4, and configured to receive command data from content processing module 250, process the command data into hardware operation data, and provide the hardware operation data to server communication module 242. In these embodiments, eye-tracking module 118 is further configured to receive ocular sensor data from server communication module 242, processes the ocular sensor data to generate ocular engagement data, and provides the ocular engagement data to content processing module 250. Further to these embodiments, ocular engagement data includes one or more metrics characterizing the level of engagement of user 230 with content being displayed via user interface 216. In an example, the ocular engagement data includes data describing whether or not the gaze of user 230 is directed towards the content displayed via user interface 216, a general level of interest in the content displayed via user interface 216 as determined by the eye movements of user 230, and the like. In these embodiments, hardware operation data includes instructions for hardware operation, such as instructions to activate eye-tracking sensors, to begin to track the gaze of user 230, to stop tracking the gaze of user 230, and the like.

In some embodiments, expression processing module 246 is implemented as a software module running on associated hardware, further detailed in FIG. 4, and configured to receive command data from content processing module 250, process the command data into hardware operation data, and provide the hardware operation data to server communication module 242. In these embodiments, expression processing module 122 is further configured to receive expression sensor data from server communication module 242, process the expression sensor data to generate emotional state data, and provide the emotional state data to content processing module 250. Further to these embodiments, emotional state data includes data describing the emotional state of user 230. In an example, emotional state data describes whether or not user 230 is confused by content being displayed via user interface 216. In these embodiments, hardware operation data includes instructions for hardware operation, such as instructions to activate expression sensors, to begin to track the expression of user 230, to stop tracking the expression of user 230, and the like.

In some embodiments, authentication module 248 is implemented as a software module running on associated hardware, further detailed in FIG. 4, and configured to receive credential data from server communication module 242 and process the received credential data to determine whether user 230 is authorized to operate user device 210. In these embodiments, authentication module 248 may compare the received credential data to previously entered credential data, which is stored within a storage device and/or memory within server 240, associated with authorized use.

In some embodiments, content processing module 250 is implemented as a software module running on associated hardware, further detailed in FIG. 4, configured to receive user instruction data from server communication module 242, receive ocular engagement data from eye-tracking module 118, receive emotional state data from expression processing module 122, process one or more of the received user instruction data, ocular engagement data, and/or emotional state data to generate command data, and to provide the command data to one or more of server communication module 242, eye-tracking module 118, and/or expression processing module 122. In these embodiments, content processing module 250 is further configured to receive external content data from server communication module 242, to retrieve internal content data from a storage device associated with server 240 (further detailed in FIG. 4), and process said external content data and internal content data to generate output data. Further to these embodiments, content processing module 250 is further configured to receive supplemental external data from server communication module 242, to retrieve supplemental internal data from the storage device associated with user device 310, and process the supplemental external data and the supplemental internal data to generate output data.

In some embodiments, command data includes instructions for a communications module to retrieve data specified within user instruction data. In an example, command data includes instructions associated with server communication module 242 for it to generate a desired query data. In this example, the instructions include requests for specific content information. In other embodiments, command data includes instructions for eye-tracking module 118 and expression processing module 122 to begin operation. In these embodiments, internal content data includes text, images, and other media stored within a storage device and/or memory associated with server 240. Further to these embodiments, supplemental internal data includes text, images, and other media of a supplemental nature to content previously presented to user 230. In these embodiments, output data includes text, images, video, and layout information. In an example, output data includes RSVP text to be presented to user 230.

In some embodiments, external data source 232 is implemented as a data source configured to receive query data from server communication module 242, process the query data to generate result data, and provide the result data to server communication module 242. In these embodiments, external data source 232 is implemented as a database that includes content information, such as for example images, text (e.g., books, articles, encyclopedia entries, blog posts, and the like), videos, metadata (e.g., relationships between images, texts, videos, and the like), and the like. In an example, external data source 232 is a database including company guidelines (e.g., the company guidelines of the company user 230 works for), sample policies, explanations of policies, a glossary of terms associated with said policies, metadata about the relationship between the terms within the glossary of terms and one or more sample policies, and the like. In other embodiments, external data source 232 is implemented as a third party information source, such as an online encyclopedia, image server, video server, dictionary, and the like. In these embodiments, external data source 132 may be implemented as a database management system (DBMS), such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data, such as, for example, a relational database, a multi-dimensional database (MDB), and the like.

In operation, user 230 operates user device 210 via user interface 216. In some embodiments, user interface 216 receives a first input including credentials associated with user 230, processes the first input into first input data, and provides the first input data to input/output module 214. In these embodiments, input/output module 214 processes the first input data into credential data and provides the credential data to user device communication module 212. Further to these embodiments, user device communication module 212 then provides the credential data to server communication module 242 within server 240, and server communication module 242 provides the credential data to authentication module 248. In these embodiments, authentication module 248 verifies that user 130 is authorized to operate user device 210. Still further to these embodiments, user 230 operates user device 210 and provides a second input including a request that content (e.g., a specific RSVP text) be displayed on user device 210 via user interface 216. In these embodiments, user interface 216 receives the second input, generates second input data, and provides the second input data to input/output module 214. Yet further to these embodiments, input/output module 214 generates user instruction data and provides the user instruction data user device communication module 212. In these embodiments, user device communication module 212 provides the user instruction data to server communication module 242 and server communication module 242 provides the user instruction data to content processing module 250. Yet still further to these embodiments, content processing module 250 processes the user instruction data and determines that one or more portions of the requested content are stored as internal content data within a storage device and/or memory associated with server 240, and further determines that one or more other portions not stored within said storage device may be stored as external content data within external data source 232. In these embodiments, content processing module 250 proceeds to generate a first command data including a request for external content data, and provides the first command data to server communication module 242. Further to these embodiments, server communication module 242 receives the first command data, generates a first query data, and provides the first query data to external data source 232. In these embodiments, external data source 232 receives the first query data, processes it to generate a first result data, and provides the first result data to server communication module 242. Still further to these embodiments, server communication module 242 receives the first result data, processes the first result data to generate external content data, and provides the external content data to content processing module 250. In these embodiments, content processing module 250 receives the external content data, retrieves the internal content data from the storage device associated with server 240, and processes the external content data and internal content data to generate a first output data. Yet further to these embodiments, content processing module 250 provides the first output data to server communication module 242. In these embodiments, server communication module 242 receives the first output data and provides the first output data to user device communication module 212. Yet still further to these embodiments, user device communication module 212 provides the first output data to input/output module 214, input/output module 214 processes the first output data into content, input/output module 214 provides the content to user interface 216, and user interface 216 displays the received content to user 230.

In some embodiments, content processing module 250 generates a second command data including instructions to begin operating eye-tracking sensor module 218 and provides the second command data to eye-tracking module 244. In these embodiments, eye-tracking module 244 receives the second command data, processes into a first hardware operation data, and provides the first hardware operation data to server communication module 242. Further to these embodiments, server communication module 242 provides the first hardware operation data to user device communication module 212, user device communication module 212 provides the first hardware operation data to eye-tracking sensor module 218, and eye-tracking sensor module 218 begins to track the movements of the eyes of user 230 in order to generate ocular sensor data. In these embodiments, content processing module 250 additionally generates a third command data including instructions to begin operating expression sensor module 220, and provides the third command data to expression processing module 246. Still further to these embodiments, expression processing module 246 receives the third command data, processes it to generate a second hardware operation data, and provides the second hardware operation data to server communication module 242. In these embodiments, server communication module 242 then provides the second hardware operation data to user device communication module 212, user device communication module 212 provides the second hardware operation data to expression sensor module 220, and expression sensor module 220 begins to track the micro-expressions of user 230 in order to generate expression sensor data.

In some embodiments, eye-tracking sensor module 218 and expression sensor module 220 track the gaze and expressions of user 230 as user interface 216 presents the content to user 230. In these embodiments, eye-tracking sensor module 218 provides ocular sensor data to user device communication module 212, user device communication module 212 provides the ocular sensor data to server communication module 242, and server communication module 242 provides the ocular sensor data to eye-tracking module 244. Further to these embodiments, expression sensor module 220 provides expression sensor data to user device communication module 212, user device communication module 212 provides the expression sensor data to server communication module 242, and server communication module 242 provides the expression sensor data to expression processing module 246. In these embodiments, eye-tracking module 244 receives the ocular sensor data, processes it to generate ocular engagement data, and provides the ocular engagement data to content processing module 250. Still further to these embodiments, expression processing module 246 receives the expression sensor data, processes it to generate emotional state data, and provides the emotional state data to content processing module 250. In these embodiments, content processing module 250 receives the ocular engagement data and the emotional state data and processes it to determine that user 230 requires supplemental content. Yet still further to these embodiments, content processing module 250 determines that one or more portions of the supplemental content are stored as supplemental internal data within a storage device associated with server 240, and one or more other portions not stored within said storage device may be stored as supplemental external data within external data source 232. In these embodiments, content processing module 250 proceeds to generate a fourth command data including a request for supplemental external data, and provides the fourth command data to server communication module 242. Further to these embodiments, server communication module 242 receives the fourth command data, generates a second query data, and provides the second query data to external data source 232. In these embodiments, external data source 232 receives the second query data, processes it to generate a second result data, and provides the second result data to server communication module 242. Yet further to these embodiments, server communication module 242 receives the second result data, processes the second result data to generate supplemental external data, and provides the supplemental external data to content processing module 250. In these embodiments, content processing module 250 then receives the supplemental external data, retrieves the supplemental internal data from the storage device associated with server 240, and processes the external content data and supplemental internal data to generate a second output data. Still further to these embodiments, content processing module 250 provides the second output data to server communication module 242, server communication module 242 provides the second output data to user device communication module 212, and user device communication module 212 provides the second output data to input/output module 214. In these embodiments, input/output module 214 then processes the second output data into content, input/output module 214 provides the content to user interface 216, and user interface 216 displays the received content to user 230.

FIG. 3 is functional block diagram illustrating exemplary system hardware for presenting supplemental content to a user based on ocular and expressive feedback, according to an embodiment. In FIG. 3, system hardware 300 includes user device 310, external data source 330, and user 332. In FIG. 3, user device 310 further includes bus 312, processor 314, input/output device 316, user interface 318, memory 320, storage device 322, interface 324, eye-tracking sensor 326, and expression sensor 328. In some embodiments, system hardware 300 can include additional, fewer, or differently arranged components than those illustrated in FIG. 3.

In FIG. 3, user device 310 is electronically coupled to and in bi-directional communication with external data source 330. In some embodiments, bus 312 is electronically coupled to and in bi-directional communication with processor 314, input/output device 316, memory 320, storage device 322, interface 324, eye-tracking sensor 326, and expression sensor 328. In these embodiments, user interface 318 is rendered by input/output device 316. Further to these embodiments, user interface 318, eye-tracking sensor 326, and expression sensor 328 are configured to interact with user 332. In these embodiments, bus 312 includes a path that allows components within user device 310 to communicate with each other.

In some embodiments, processor 314 is implemented as any computing hardware component including a central processing unit configured to execute instructions to perform one or more actions associated with user device 310. In these embodiments, processor 314 can include a microprocessor, an application specific integrated circuit (ASIC), a field programmable object array (FPOA), and the like. Further to these embodiments, processor 314 interprets and executes instructions retrieved from memory 320 and storage device 322. In an example and referring to FIG. 1, processor 314 is configured to interpret and execute instructions associated with the operation of communication module 112, input/output module 114, user interface 116, eye-tracking module 118, eye-tracking sensor module 120, expression processing module 122, expression sensor module 120, authentication module 126, and content processing module 128.

In some embodiments, input/output device 316 is implemented as a computer hardware component that includes peripherals and/or other mechanisms that may enable a user to input information to user device 310, including keyboards, computer mice, buttons, touch screens, voice recognition, biometric mechanisms, and the like. In these embodiments, input/output device 316 may be further configured to include one or more mechanisms for outputting information to user 332, such as, for example displays, light emitting diodes (LEDs), printers, speakers, and the like. Further to these embodiments, input/output device 316 is implemented to include a computer hardware component configured to output data to user 332 via textual and/or graphical content, such as RSVP text, images, videos, audio, and the like. In these embodiments, input/output device 316 is further configured to provide content by rendering the content onto user interface 318 and to receive input from user 332 via user interface 318. In an example and referring to FIG. 1, user interface 318 is implemented in a manner substantially similar to user interface 116.

In some embodiments, memory 320 is implemented as a computing hardware component that allows the storage and manipulation of data during operations carried out by processor 314. In an example and referring to FIG. 1, memory 320 allows the storage and manipulation of data during operations associated with communication module 112, input/output module 114, user interface 116, eye-tracking module 118, eye-tracking sensor module 120, expression processing module 122, expression sensor module 120, authentication module 126, and/or content processing module 128. examples of memory 320 include random access memory (RAM), read-only memory (ROM), flash memory, and the like.

In some embodiments, storage device 322 is implemented as a computer hardware component that allows the storage and retrieval of data associated with running one or more modules and is configured to store information and instructions for execution by processor 314. In an example and referring to FIG. 1, storage device 322 is implemented to store and retrieve data associated with one or more of communication module 112, input/output module 114, user interface 116, eye-tracking module 118, eye-tracking sensor module 120, expression processing module 122, expression sensor module 120, authentication module 126, and/or content processing module 128. In an example, storage device 322 includes internal content data associated with policies/contracts, contracts, and the like. In this example, storage device 322 is further configured to store the executable versions of communication module 112, input/output module 114, user interface 116, eye-tracking module 118, eye-tracking sensor module 120, expression processing module 122, expression sensor module 120, authentication module 126, and/or content processing module 128 for execution by processor 314 to control the associated componentry within system hardware 300. Examples of storage device 322 include magnetic and/or optical recording media, ferroelectric RAM (F-RAM) hard disks, solid-state drives, floppy disks, optical discs, and the like.

In some embodiments, interface 324 is implemented as a computer hardware component configured to allow user device 310 to communicate with other computing devices and/or systems through network connections. Examples of network connections include any suitable connections between computers, such as, for example intranets, local area networks (LANs), virtual private networks (VPNs), wide area networks (WANs), the Internet, and the like. Interface 324 can be implemented as any suitable interface, such as, network interface controllers, wireless network interface controllers, and the like.

In some embodiments, eye-tracking sensor 326 is implemented as a computer hardware component configured to track the gaze of user 332. In these embodiments, eye-tracking sensor 326 can be implemented as an optical tracking device, such as an infrared emitter and camera, a video camera, and the like. In an example and referring to FIG. 1, eye-tracking sensor 326 is configured to be controlled by eye-tracking sensor module 120. Further to these embodiments, expression sensor 328 is implemented as a computer hardware component configured to determine one or more emotional states associated with user 332. In these embodiments, expression sensor 328 can be implemented as an optical tracking device, such as an infrared emitter and camera, a video camera, and the like. In an example and referring to FIG. 1, expression sensor 328 is configured to be controlled by expression sensor module 124.

In some embodiments, external data source 330 is implemented as a database including external content. In an example and referring to FIG. 1, external data source 330 is implemented in a manner substantially similar to external data source 132. In another example, external data source 330 is implemented as one or more of a server, authorized computing device, smartphone, desktop computer, laptop computer, tablet computer, PDA, another type of processor-controlled device that may receive, process, transmit digital data, and the like.

FIG. 4 is functional block diagram illustrating exemplary system hardware for presenting supplemental content to a user based on ocular and expressive feedback, according to another embodiment. In FIG. 4, system hardware 400 includes user device 410, external data source 430, user 432, and server 440. In FIG. 4, user device 410 further includes user device bus 412, processor 414, input/output device 416, user interface 418, memory 420, storage device 422, user device interface 424, eye-tracking sensor 426, and expression sensor 428. In FIG. 4, server 440 further includes server bus 442, processor 444, input/output device 446, memory 448, storage device 450, and server interface 452. In some embodiments, system hardware 400 can include additional, fewer, or differently arranged components than those illustrated in FIG. 4.

In FIG. 4, user device 410 is electronically coupled to and in bi-directional communication with server 440, and server 440 is electronically coupled to and in bi-directional communication with external data source 430. In some embodiments, user device bus 412 is electronically coupled to and in bi-directional communication with processor 414, input/output device 416, memory 420, storage device 422, user device interface 424, eye-tracking sensor 426, and expression sensor 428. In these embodiments, user interface 418 is rendered by input/output device 416. Further to these embodiments, user interface 418, eye-tracking sensor 426, and expression sensor 428 are configured to interact with user 432. In these embodiments, user device bus 412 includes a path that allows components within user device 410 to communicate with each other. Yet further to these embodiments, server bus 442 is electronically coupled to and in bi-directional communication with processor 444, input/output device 446, memory 448, storage device 450, and server interface 452. In these embodiments, server bus 442 includes a path that allows components within server 440 to communicate with each other.

In some embodiments, processor 414 is implemented as computing hardware component including a central processing unit able to carry out instructions to perform one or more instructions associated with user device 410. In these embodiments, processor 414 can include a microprocessor, an application specific integrated circuit (ASIC), a field programmable object array (FPOA), and the like. Further to these embodiments, processor 414 interprets and executes instructions retrieved from memory 420 and storage Device 422. In an example and referring to FIG. 2, processor 414 is configured to interpret and execute instructions associated with the operation of user device communication module 212, input/output module 214, user interface 216, eye-tracking sensor module 218, and expression sensor module 220. In these embodiments, processor 444 is implemented as any computing hardware component including a central processing unit able to execute instructions to perform one or more actions associated with server 440. Still further to these embodiments, processor 444 can include a microprocessor, an application specific integrated circuit (ASIC), a field programmable object array (FPOA), and the like. In these embodiments, processor 444 interprets and executes instructions retrieved from memory 448 and storage device 450. In an example and referring to FIG. 2, processor 444 is configured to interpret and execute instructions associated with the operation of server communication module 242, eye-tracking module 244, expression processing module 246, authentication module 248, and content processing module 250.

In some embodiments, input/output device 416 is implemented as a computer hardware component that includes peripherals and/or other mechanisms that may enable a user to input information to user device 410, including keyboards, computer mice, buttons, touch screens, voice recognition, biometric mechanisms, and the like. In these embodiments, input/output device 416 may be further configured to include one or more mechanisms for outputting information to user 432, such as, for example displays, light emitting diodes (LEDs), printers, speakers, and the like. Further to these embodiments, input/output device 416 is implemented to include a computer hardware component able to output data to user 432 via textual and/or graphical content, such as RSVP text, images, videos, audio, and the like. In these embodiments, input/output device 416 is further configured to provide content by rendering the content onto user interface 418 and to receive input from user 432 via user interface 418. In an example and referring to FIG. 2, user interface 418 is implemented in a manner substantially similar to user interface 216. Still further to these embodiments, input/output device 446 is implemented as a computer hardware component that includes peripherals and/or other mechanisms that may enable a user to input information to server 440, including keyboards, computer mice, buttons, touch screens, voice recognition, biometric mechanisms, and the like. In these embodiments, input/output device 416 may be further configured to include one or more mechanisms for outputting information to user 432, such as, for example displays, light emitting diodes (LEDs), printers, speakers, and the like.

In some embodiments memory 420 is implemented as a computing hardware component that allows the storage and manipulation of data during operations carried out by processor 414. In an example and referring to FIG. 2, memory 420 allows the storage and manipulation of data during operations associated with user device communication module 212, input/output module 214, user interface 216, eye-tracking sensor module 120, and expression sensor module 120. In these embodiments, memory 448 is implemented as computer hardware component that allows the storage and manipulation of data during operations carried out by processor 444. In an example and referring to FIG. 2, memory 448 allows the storage and manipulation of data during operations associated with server communication module 242, eye-tracking module 244, expression processing module 246, authentication module 248, and/or content processing module 250. Examples of memory 420 and memory 448 include random access memory (RAM), read-only memory (ROM), flash memory, and the like.

In some embodiments, storage device 422 is implemented as a computer hardware component that allows the storage and retrieval of data associated with running one or more modules and executable versions of the one or more modules and is configured to store information and instructions for execution by processor 414 to control the associated componentry within user device 410. In an example and referring to FIG. 2, storage device 422 is implemented to store and retrieve data associated with one or more of user device communication module 212, input/output module 214, user interface 216, eye-tracking sensor module 218, and expression sensor module 220 for execution by processor 314 to control the associated componentry within system hardware 300. In these embodiments, storage device 450 is implemented as a computer hardware component that allows the storage and retrieval of data associated with running one or more modules and executable versions of the one or more modules and is configured to store information and instructions for execution by processor 444 to control the associated componentry within server 440. In an example and referring to FIG. 2, storage device 450 is implemented to store and retrieve data associated with one or more of server communication module 242, eye-tracking module 244, expression processing module 246, authentication module 248, and/or content processing module 250. examples of storage device 422 and storage device 450 include magnetic and/or optical recording media, ferro-electric RAM (F-RAM) hard disks, solid-state drives, floppy disks, optical discs, and the like.

In other embodiments, user device interface 424 and server interface 452 are implemented as a computer hardware components configured to allow user device 310 and server 440 to communicate with other computing devices and/or systems through network connections. Examples of network connections include any suitable connections between computers, such as, for example intranets, local area networks (LANs), virtual private networks (VPNs), wide area networks (WANs), the Internet, and the like. User device interface 424 and server interface 452 can be implemented as any suitable interface, such as, network interface controllers, wireless network interface controllers, and the like.

In some embodiments, eye-tracking sensor 426 is implemented as a computer hardware component configured to track the gaze of user 432. In these embodiments, eye-tracking sensor 426 can be implemented as an optical tracking device, such as an infrared emitter and camera, a video camera, and the like. In an example and referring to FIG. 2, eye-tracking sensor 426 is configured to be controlled by eye-tracking sensor module 218. Further to these embodiments, expression sensor 428 is implemented as a computer hardware component configured to determine one or more emotional states associated with user 432. In these embodiments, expression sensor 428 can be implemented as an optical tracking device, such as an infrared emitter and camera, a video camera, and the like. In an example and referring to FIG. 2, expression sensor 428 is configured to be controlled by expression sensor module 220.

In some embodiments, external data source 430 is implemented as a database including external content. In an example and referring to FIG. 2, external data source 430 is implemented in a manner substantially similar to external data source 232. In another example, external data source 430 is implemented as one or more of a server, authorized computing device, smartphone, desktop computer, laptop computer, tablet computer, PDA, another type of processor-controlled device that may receive, process, transmit digital data, and the like.

Figure 5:
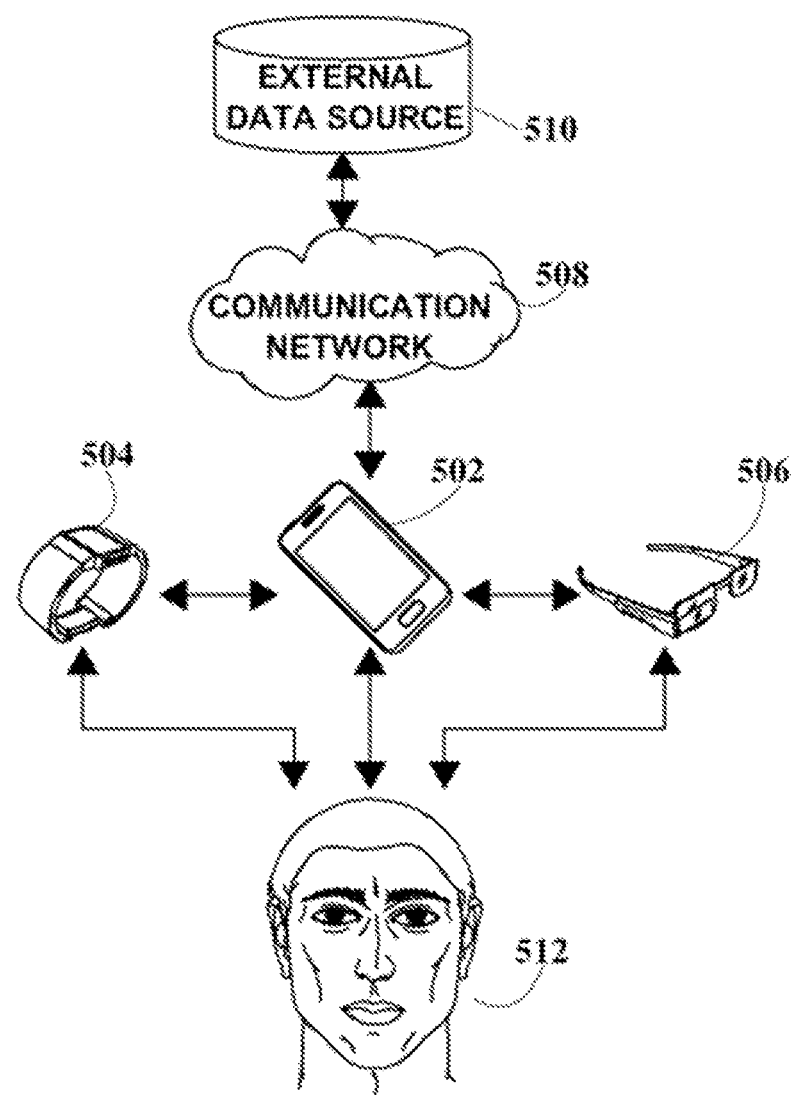
FIG. 5 is a functional block diagram illustrating an exemplary system for presenting supplemental content to a user based on ocular and expressive feedback, according to an embodiment.

FIG. 5 is a functional block diagram illustrating an exemplary system for presenting supplemental content to a user based on ocular and expressive feedback, according to an embodiment. In FIG. 5, supplemental content display system 500 includes first user device 502, second user device 504, third user device 506, communication network 508, external data source 510, and user 512. In some embodiments, first user device 502 is wirelessly coupled to and in bi-directional communication with second user device 504 and third user device 506. In these embodiments, first user device 502 is further wirelessly coupled to and in bi-directional communication with communication network 508, and communication network 508 is operably coupled to and in bi-directional communication with external data source 510. further to these embodiments, first user device 502, second user device 504, and third user device 506 are configured to interact with user 512, supplemental content display system 500 may include additional, fewer, or differently arranged components than those described in FIG. 5

In some embodiments, first user device 502 is implemented as a computing device configured to: receive input from user 512; retrieve internal content data from a storage device (not shown); receive external content data from external data source 510 via communication network 508; process the internal content data and external content data to generate output data; provide output data to one or more of second user device 504 and third user device 506; and receive ocular sensor data and/or expression sensor data from second user device 504 and/or third user device 506. In an example and referring to FIGS. 1 and 3, first user device 502 functions in a manner substantially similar to user device 110 and user device 310. In another example, first user device 502 is implemented as a mobile device able to display RSVP text and/or provide said RSVP text to second user device 504 and/or third user device 506.

In some embodiments, second user device 504 is implemented as a computing device configured to receive input from user 512, receive output data from first user device 502, generate ocular sensor data and/or expression sensor data, and provide ocular sensor data and/or expression sensor data to first user device 502. In an example and referring to FIGS. 1 and 3, second user device 504 is implemented to function in a manner substantially similar to user device 110 and user device 310. In another example, second user device 504 is implemented as an intelligent wearable device (e.g., a smart watch) able to receive RSVP text from first user device 502, display RSVP text to user 512, generate ocular sensor data and/or expression sensor data, and provide the ocular sensor data and/or expression sensor data to first user device 502.

In some embodiments, third user device 506 is implemented as a computing device configured to receive input from user 512, receive output data from first user device 502, generate ocular sensor data and/or expression sensor data, and provide ocular sensor data and/or expression sensor data to first user device 502. In an example and referring to FIGS. 1 and 3, third user device 506 is implemented to function in a manner substantially similar to user device 110 and user device 310. In another example, third user device 506 is implemented as an intelligent wearable device (e.g., smart glasses) able to receive RSVP text from first user device 502, display RSVP text to user 512, generate ocular sensor data and/or expression sensor data, and provide the ocular sensor data and/or expression sensor data to first user device 502.

In some embodiments, external data source 510 is implemented as a data source configured to provide external content data to first user device 502 via communication network 508. In an example and referring to FIGS. 1 and 3, external data source 510 is implemented to function in a manner substantially similar to external data source 132 and external data source 232. In other embodiments, communication network 508 is implemented as a network connection configured to provide communication capabilities between first user device 502 and external data source 510. In an example and referring to FIG. 1, communication network 508 is implemented to function in a manner substantially similar to communications network 134.

Figure 6:
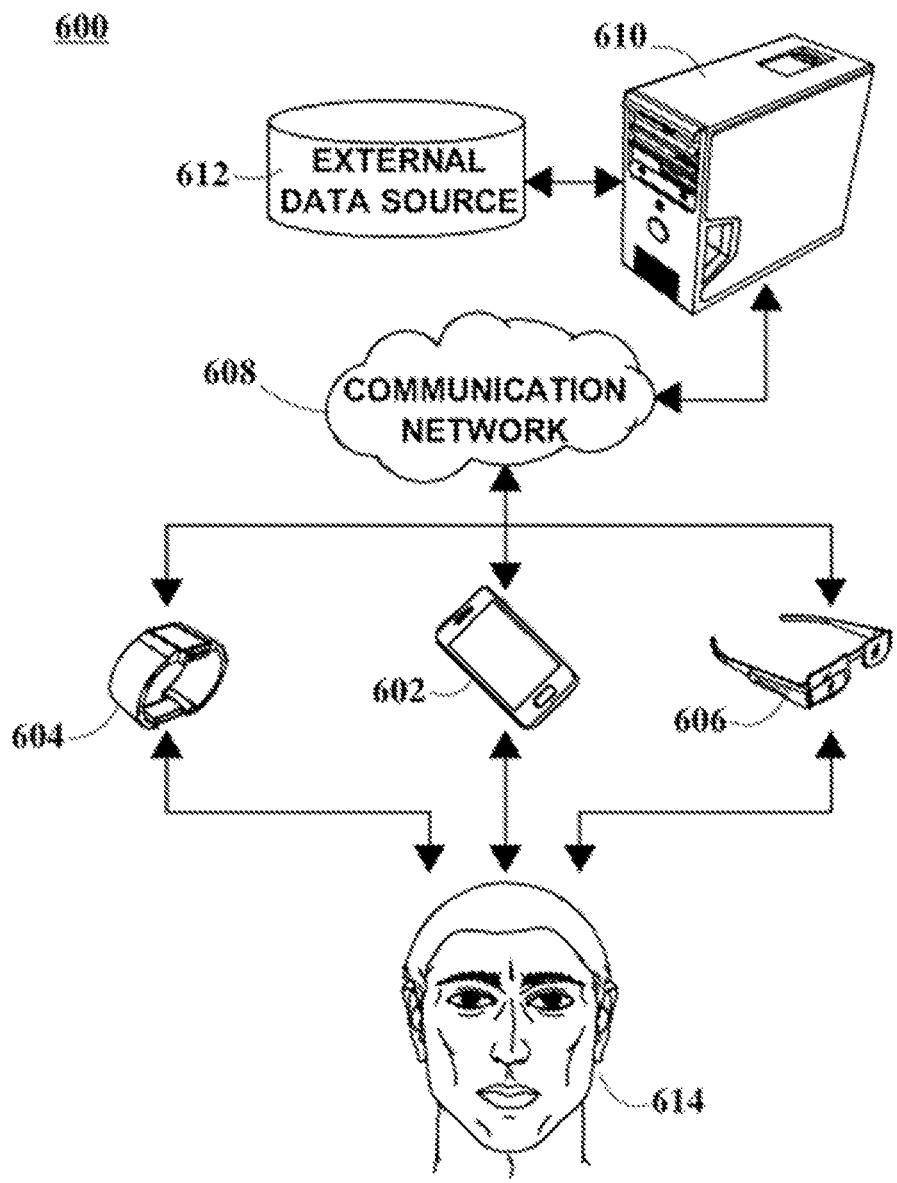
FIG. 6 is a functional block diagram illustrating an exemplary system for presenting supplemental content to a user based on ocular and expressive feedback, according to another embodiment.

FIG. 6 is a functional block diagram illustrating an exemplary system for presenting supplemental content to a user based on ocular and expressive feedback, according to another embodiment. In FIG. 6, supplemental content display system 600 includes first user device 602, second user device 604, third user device 606, communication network 608, server 610, external data source 612, and user 614. In some embodiments, first user device 602, second user device 604, and third user device 606 are operably coupled to and in bi-directional communication with communication network 608, and communication network 608 is operably coupled to and in bi-directional communication with server 610. In these embodiments, first user device 602, second user device 604, and third user device 606 are configured to interact with user 614. In other embodiments, supplemental content display system 500 may include additional, fewer, or differently arranged components than those described in FIG. 6.

In some embodiments, first user device 602, second user device 604, and third user device 606 are implemented as computing devices configured to receive input from user 512, provide user instruction data, ocular sensor data, and/or expression sensor data to server 610, and receive output data from server 610. In an example and referring to FIGS. 2 and 4, first user device 602, second user device 604, and third user device 606 are implemented to function in a manner substantially similar to user device 210 and user device 410. In another example, first user device 602, second user device 604, and third user device 606 are implemented as computing devices (e.g., mobile devices, wearable devices, and the like) able to display RSVP text.

In some embodiments, server 610 is implemented as a computing device configured to receive user instruction data, ocular sensor data, and/or expression sensor data, to receive external content data and/or supplemental external data from external data source 612, to retrieve internal content data and/or supplemental internal data from a storage device (not shown), process the internal content data, supplemental internal data, supplemental external data, and/or external content data into output data, and provide the output data to one or more of first user device 602, second user device 604, and third user device 606. In an example and referring to FIGS. 2 and 4, server 610 is implemented to function in a manner substantially similar to server 240 and server 440.

In some embodiments, external data source 612 is implemented as a data source configured to provide external content data to server 610. In an example and referring to FIGS. 2 and 4, external data source 612 is implemented to function in a manner substantially similar to external data source 232 and external data source 430. In other embodiments, communication network 608 is implemented as a network connection configured to provide communication capabilities between server 610 and one or more of first user device 602, second user device 604, and third user device 606. In an example and referring to FIG. 2, communication network 608 is implemented to function in a manner substantially similar to first communications network 234.

Figure 7:
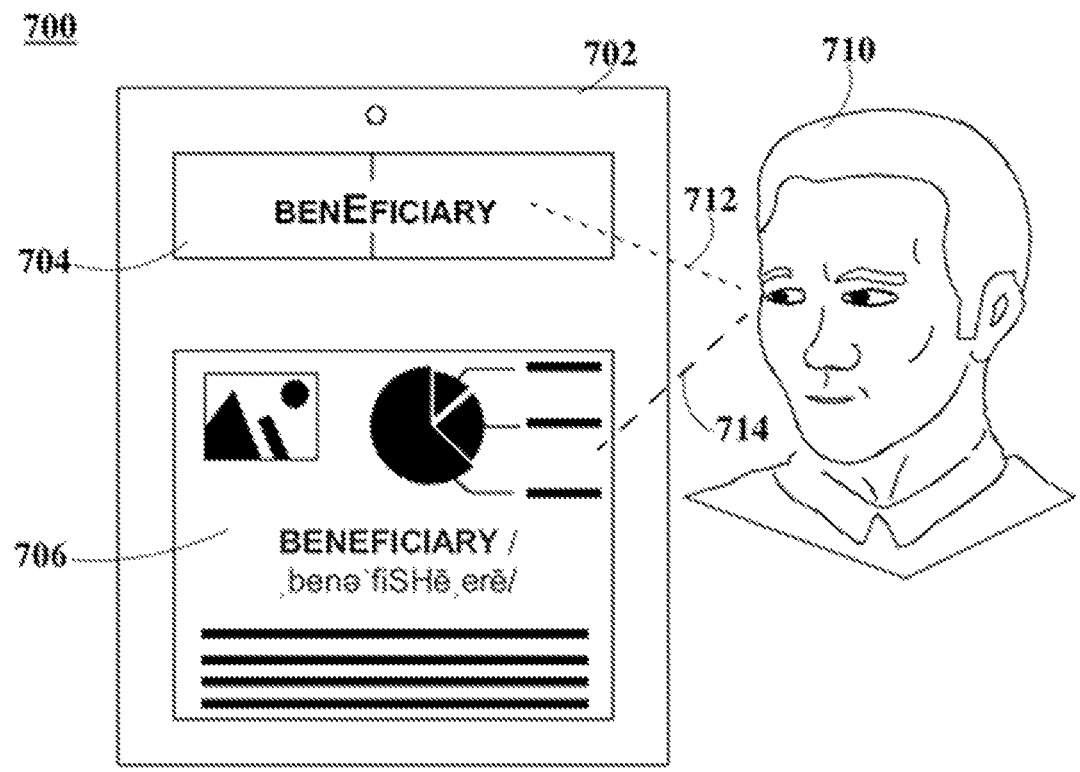
FIG. 7 is a block diagram illustrating a first exemplary use case for presenting supplemental content to a user based on ocular and expressive feedback, according to an embodiment.

FIG. 7 is a block diagram illustrating a first exemplary use case for presenting supplemental content to a user based on ocular and expressive feedback, according to an embodiment. In FIG. 7, use case 700 includes user device 702 and user 710. In FIG. 7, user device 702 includes rsvp text display 704 and supplemental content display 706. in some embodiments, the gaze of user 710 can be characterized by first gaze line 712 and second gaze line 714. Use case 700 can include additional, fewer, or differently arranged components than those illustrated in FIG. 7.

In some embodiments, user device 702 is implemented as a computing device configured to: receive a request for content from user 710; generate content from internal and/or external content data, display said content to user 710; generate ocular engagement data and emotional state data based on the behavior of user 710 as the content is being displayed; determine if supplemental content is needed based on the ocular engagement data and emotional state data; and generate supplemental content based on external and/or internal supplementary data. In an example and referring to FIGS. 1 and 3, user device 702 is configured in a manner substantially similar to user device 110 and user device 310. In these embodiments, RSVP text display 704 is implemented as a first portion of a user interface associated with user device 702 and configured to display RSVP text requested by user 710. Further to these embodiments, supplemental content display 706 is implemented as a second portion of a user interface associated with user device 702 and is configured to display supplemental content associated with content being displayed by RSVP text display 704.

In operation, user 710 requests a desired RSVP text be displayed on user device 702. In some embodiments, user device 702 retrieves internal content data from a storage device (not shown) and external content data from an external data source (not shown), generates the desired content, and displays the desired content (e.g., the desired RSVP text) on RSVP text display 704. In these embodiments, user 710 consumes the content, and the gaze of user 710 is characterized by first gaze line 712.

Further to these embodiments, user device 702 monitors the behavior of user 710 in order to generate ocular engagement data and/or emotional state data. In an example and referring to FIGS. 1 and 3, eye-tracking sensor module 120 controls eye-tracking sensor 326 and begins to track the movements of the eyes of user 130 in order to generate ocular sensor data, and provides the generated sensor data to eye-tracking module 118. In this example, Expression Sensor Module 124 controls Expression Sensor 328 and begins to track the micro-expressions of User 130 in order to generate expression sensor data, and provides the expression sensor data to Expression Processing Module 122. Further to this example, eye-tracking module 118 processes the ocular sensor data into ocular engagement data, and Expression Processing Module processes the expression sensor data into emotional state data.

The ocular engagement data can be assigned a value, which can represent an amount of time that the user's gaze is directed toward an item or away from the user interface. For example, if the user is gazing an item for more than one second, the user may not understand the item. In another example, if the user is gazing away from the user interface for more than one second, the user may be bored or distracted. In the exemplary embodiment, this threshold value is set at one second, but any time period can be used. When the value is above this threshold value, the system can query for supplemental content that is related to the content being displayed when the user was gazing for a long period of time or gazing away. A fixation for reading text may be about 200 ms in duration, so a threshold value can be based upon this value, whereby a threshold can be established at about 500 ms, 1 second, or 2 seconds. When detecting whether a user's eyes are distracted away from the displayed content, a different threshold value can be used, which can be established at 1 second, 2 seconds, 3 seconds, or 4 seconds.

The content processing module can assign a state of the user based upon the state data. The state data is associated with the content that was being displayed when the expression sensor data was captured. The expression sensor data is analyzed to determine whether any micro-expressions are associated with a particular state, such as disgust, anger, fear, sadness, happiness, surprise, amusement, contempt, embarrassment, anxiety, guilt, pride, relief, contentment, pleasure, shame, confused, distracted, upset, or content. If the state is content, then the content processing module will continue to present the next portion of RSVP content. If the user is associated with another state, the content processing module will query for supplemental content to display to the user, where the supplemental content is associated with the content that was associated with the determined state.

In some embodiments, user device 702 may then detect that user 710 looks away from rsvp text display 704 and towards supplemental content display 706, as characterized by second gaze line 714. In these embodiments, the generated ocular engagement data is used by user device 702 to determine that the user wishes to view information supplemental to the text being displayed on RSVP text display 704.

In some embodiments, user device 702 proceeds to pause the display of content on RSVP text display 704, generate supplemental content, and display the supplemental content on supplemental content display 706. In these embodiments, as user 710 views content on rsvp text display 704, user device 702 may analyze the generated emotional state data and detect that user 710 is feeling confused. Further to these embodiments, user device 702 may then proceed to pause the display of content on rsvp text display 704, generate supplemental content, and display the supplemental content on supplemental content display 706.

In an example, user 710 is an agent and requests information regarding a type of policy/contract. In this example, the information is stored as RSVP text and is displayed to user 710 via RSVP text display 704. As user 710 consumes the content, user device 702 observes user 710 and determines that user 710 is confused by the term "Beneficiary" being displayed on RSVP text display 704. In this example, user device 702 then pauses the content being displayed via RSVP text display 704 and generates supplemental content for display on supplemental content display 706. Further to this example, the supplemental content includes a definition for the term, the context of the term within the text, and/or statistics associated with the term (e.g., number of hits within the document, prevalence across multiple documents, and the like).

Figure 8:
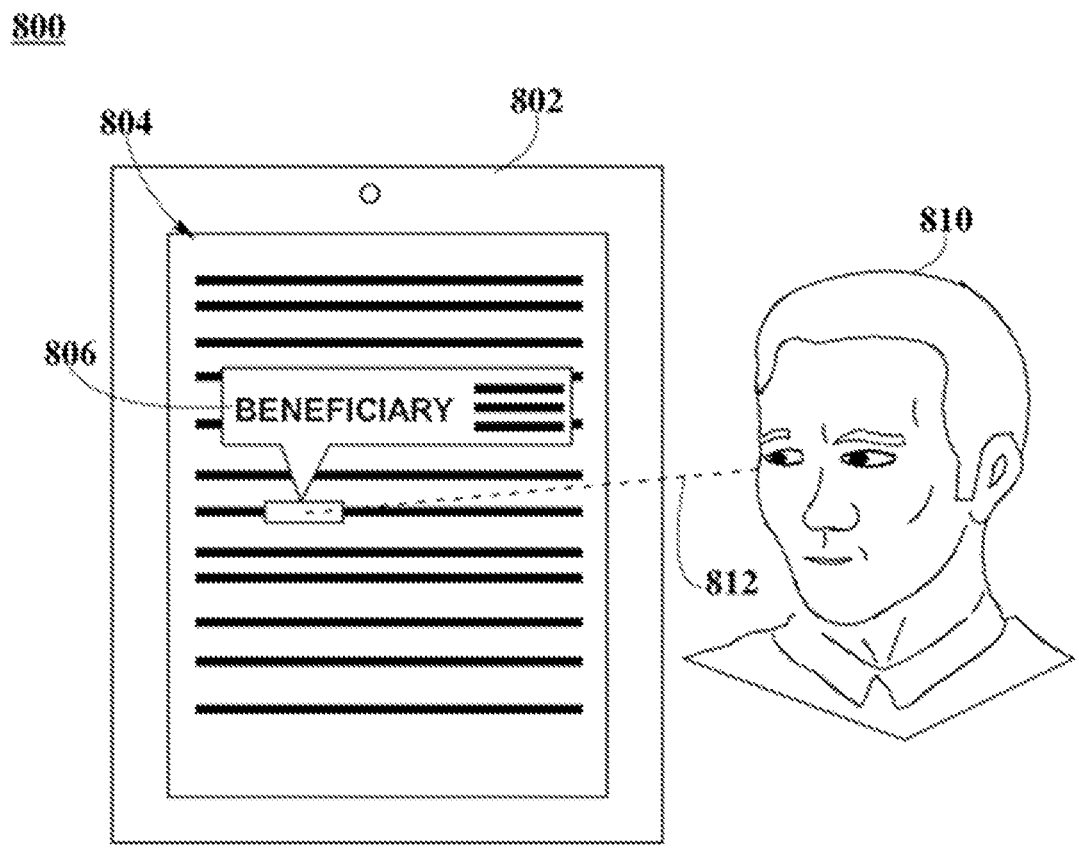
FIG. 8 is a block diagram illustrating a second exemplary use case for presenting supplemental content to a user based on ocular and expressive feedback, according to another embodiment.

FIG. 8 is a block diagram illustrating a second exemplary use case for presenting supplemental content to a user based on ocular and expressive feedback, according to another embodiment. In FIG. 8, use case 800 includes user device 802 and user 810. In FIG. 8, user device 802 includes media display 804 and supplemental content pop-up 806. In FIG. 8, the gaze of user 810 can be characterized by fixed gaze line 812. In other embodiments, use case 800 can include additional, fewer, or differently arranged components than those illustrated in FIG. 8.

In some embodiments, user device 802 is implemented as a computing device configured to receive a request for content from user 810, generate content from internal and/or external content data, to display said content to user 810, generate ocular engagement data and emotional state data based on the behavior of user 810 as the content is being displayed, to determine if supplemental content is needed based on the ocular engagement data and emotional state data, and to generate supplemental content based on external and/or internal supplementary data. In an example and referring to FIGS. 1 and 3, user device 802 is implemented to function in a manner substantially similar to user device 110 and user device 310. In other embodiments, media display 804 is implemented as a first portion of a user interface associated with user device 802 and configured to display text and media requested by user 710. In yet other embodiments, supplemental content pop-up 806 is implemented as a second portion of a user interface associated with user device 802 and configured to display supplemental content associated with content being displayed by media display 804.

In operation, user 810 requests a desired content (e.g., RSVP text) be displayed on user device 802. User device 802 proceeds to retrieve internal content data from a storage device (not shown) and external content data from an external data source (not shown), generates the desired content, and displays the desired content on media display 804. User 810 proceeds to consume the content, and the gaze of user 810 is characterized by fixed gaze line 812. User device 802 then monitors the behavior of user 810 in order to generate ocular engagement data and/or emotional state data. In an example and referring to FIGS. 1 and 3, eye-tracking sensor module 120 controls eye-tracking sensor 326 and begins to track the movements of the eyes of user 130 in order to generate ocular sensor data, and provides the generated sensor data to eye-tracking module 118. In this example, expression sensor module 124 controls expression sensor 328 and begins to track the micro-expressions of user 130 in order to generate expression sensor data, and provides the expression sensor data to expression processing module 122. Further to this example, eye-tracking module 118 processes the ocular sensor data into ocular engagement data, and expression processing module processes the expression sensor data into emotional state data.

In some embodiments, user device 802 may then detect that user 810 looks fixedly at a particular area displayed on media display 804, as characterized by fixed gaze line 812. In these embodiments, the generated ocular engagement data is used by user device 802 to determine that the user wishes to view information supplemental to the text being displayed on media display 804. User device 802 proceeds to generate supplemental content and to display the supplemental content on supplemental content pop-up 806.

Figure 9:
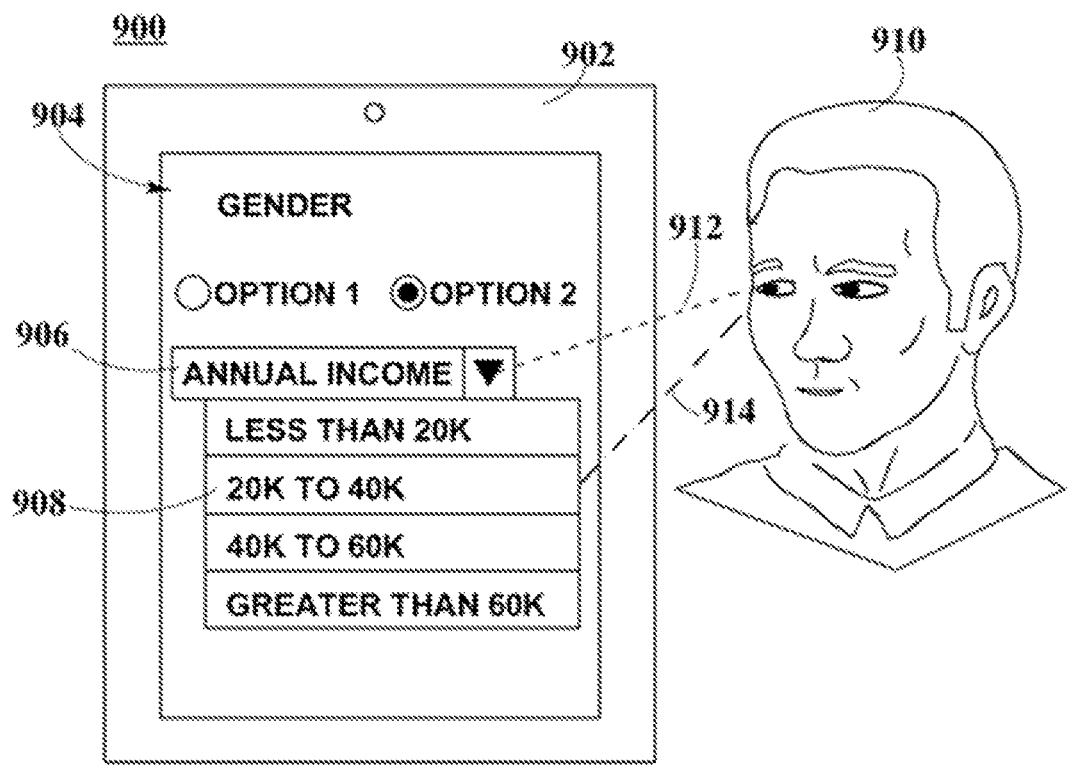
FIG. 9 is a block diagram illustrating a third exemplary use case for presenting supplemental content to a user based on ocular and expressive feedback, according to yet another embodiment.

FIG. 9 is a block diagram illustrating a third exemplary use case for presenting supplemental content to a user based on ocular and expressive feedback, according to another embodiment. In FIG. 9, use case 900 includes user device 902 and user 910. In FIG. 9, user device 902 includes user interface 904, drop-down menu 906, and selection 908. In FIG. 9, user 910 displays first gaze line 912 and second gaze line 914. In other embodiments, use case 900 can include additional, fewer, or differently arranged components than those illustrated in FIG. 9.

In some embodiments, user device 902 is implemented as a computing device able to receive a request for content from user 910, generate content from internal and/or external content data, to display said content to user 910, generate ocular engagement data and emotional state data based on the behavior of user 910 as the content is being displayed, and to perform actions based on the ocular engagement data and emotional state data. In an example and referring to FIGS. 1 and 3, user device 902 is implemented to function in a manner substantially similar to user device 110 and user device 310. In another example and referring to FIGS. 1 and 3, user interface 904 is implemented to function in a manner substantially similar to user interface 116 and user interface 318 and configured to display drop-down menu 906 and selection 908.

In operation, user 910 requests a desired content (e.g., a form) be displayed on user device 902. User device 902 proceeds to retrieve internal content data from a storage device (not shown) and external content data from an external data source (not shown), generates the desired content (e.g., a form), and displays the desired content on user interface 904. User 910 proceeds to consume the content, and the gaze of user 910 is monitored in order to generate ocular engagement data and/or emotional state data. In an example and referring to FIGS. 1 and 3, eye-tracking sensor module 120 controls eye-tracking sensor 326 and begins to track the movements of the eyes of user 130 in order to generate ocular sensor data, and provides the generated sensor data to eye-tracking module 118. In this example, expression sensor module 124 controls expression sensor 328 and begins to track the micro-expressions of user 130 in order to generate expression sensor data, and provides the expression sensor data to expression processing module 122. Further to this example, eye-tracking module 118 processes the ocular sensor data into ocular engagement data, and expression processing module processes the expression sensor data into emotional state data.

In this exemplary embodiment, a user is viewing a display presenting a form. As the user completes the form by entering inputs into a computing device, the system can sense micro-expressions and/or eye tracking to determine where the user may be having difficulty with the form or to get other feedback on portions of the form. If, for example, the user is sensed to have difficulty answering or completing a particular portion of a form, the system can present additional content in the form of a new window that is generated and displayed over the display of the form. The new window can include information about the particular portion of the form content that is causing difficulty for the user. If the user appears distracted, the system can present questions to prompt the user rather than passively wait for the responses to be inputted.

In some embodiments, user device 902 may then detect that user 910 looks fixedly at a particular area displayed on user interface 904, as characterized by first gaze line 912 and proceeds to select and activate drop-down menu 906. In these embodiments, the generated ocular engagement data is used by user device 902 to determine that the user wishes to select an option on drop-down menu 906, and proceeds to activate selection 908.

Figure 10:
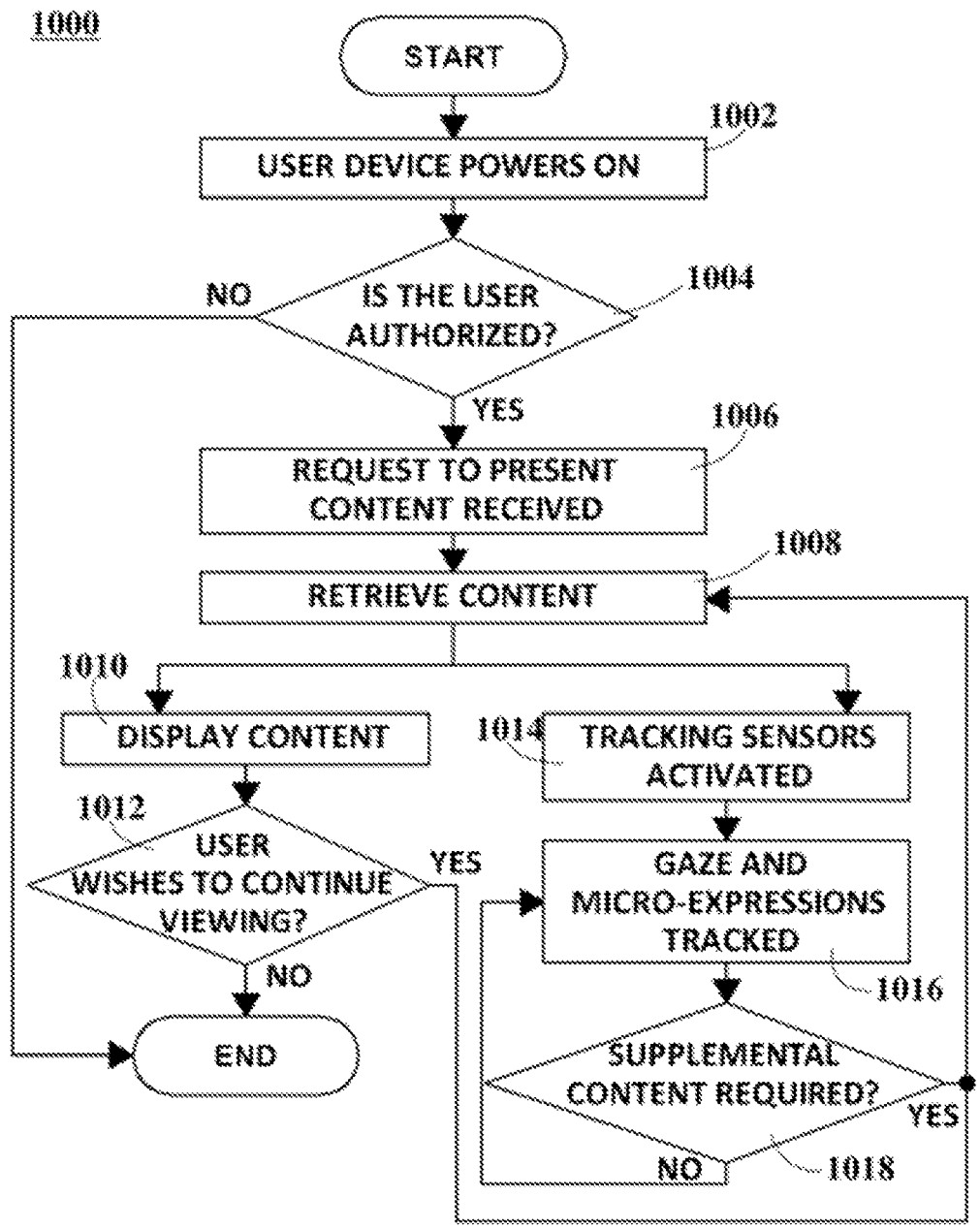
FIG. 10 is a flow chart of an exemplary method for presenting supplemental content to a user based on ocular and expressive feedback, according to an embodiment.

FIG. 10 is a flow chart of an exemplary method for presenting supplemental content to a user based on ocular and expressive feedback, according to an embodiment. In some embodiments, said method may be executed in system hardware and software architectures similar to those described in FIGS. 1-9, above.

In FIG. 10, process 1000 begins at step 1002. At step 1002, a user powers a user device on. In an example and referring to FIGS. 1 and 3, user 130 powers on user device 110. In an example, user device 110 is powered on when user 130 inputs a command via an input/output device. In some embodiments, the user device loads a content processing module, an authentication module, a communication module, an input/output module, an eye-tracking module, and an expression tracking module from the user device memory into the user device processor, which instructs the device processor to execute the method described herein. Process 1000 proceeds to step 1004.

At step 1004, the authorization module is loaded into memory by the processor and instructs the processor to execute instructions to: receive credential data; compare the received credential data to credentials previously stored within the storage device; and determine if the user is authorized. If the user is authorized to operate the user device, process 1000 continues to step 1006. Otherwise, process 1000 ends.

At step 1006, the input/output module is loaded into memory by the processor and instructs the processor to execute instructions to receive input from the user including a request that a specified content is presented. At this step, the input/output module instructs the user device processor to process the input to generate user instruction data, and provides the user instruction data to the content processing module. The content processing module then instructs the processor to process the user instruction data, and determines if the request requires the retrieval of external content data and/or internal content data. The content processing module then generates the command data required to carry out the instructions within the user instruction data. Process 1000 proceeds to step 1008.

At step 1008, the content processing module is loaded into memory by the processor and instructs the processor to execute instructions to provide command data to the communications module to retrieve external content data and/or supplemental external data from the external data source. The communications module then instructs the user device processor to provide query data to the external data source via the user device interface. The external data source receives the query data, processes it, and returns result data to the communications module. The communications module then carries out instructions on the user device processor in order to process the result data and provide the external content data and/or supplemental external data to the communications module. The communications module then carries out instructions on the user device processor to retrieve internal content data and/or supplemental internal data from the storage device associated with the user device. Process 1000 then proceeds to step 1010 and step 1014.

At step 1010, the content processing module is loaded into memory by the processor and instructs the processor to execute instructions to instruct the user device processor to process the internal content data, external content data, supplemental internal data, and/or supplemental external data to generate output data. The content processing module then provides the output data to the input/output module, and the input/output module carries out instructions on the user device processor to process the output data into content, and the input/output module displays the content on an input/output device (e.g., a display). In some embodiments, the user interface associated with the user device includes one or more regions where a specified content is to be displayed. Process 1000 proceeds to step 1012.

At step 1012, the content processing module is loaded into memory by the processor and instructs the processor to execute instructions to: determines if the user wishes to continue viewing content. In some embodiments, the content processing module determines that the user wishes to continue viewing after processing user instruction data provided by the input/output module. If the user wishes to continue viewing data, process 1000 proceeds to step 1008. Otherwise, process 1000 ends.

At step 1014, the content processing module is loaded into memory by the processor and instructs the processor to execute instructions to send command data to the eye-tracking module and the expression processing module, including instructions to activate the eye-tracking sensor and the expression sensor. At this step, the processor carries out instructions to prepare the user device to track the gaze and microexpressions of the user, such as for example by allocating the memory and other system resources needed to track the gaze and microexpressions of the user. Process 1000 continues to step 1016.

At step 1016, the eye-tracking module and the expression processing module are loaded into memory by the processor and instruct the processor to execute instructions to track the gaze and the microexpressions of the user. At this step, the eye-tracking module uses ocular sensor data from the eye-tracking sensor (e.g., images, gaze path curves, and the like) to determine the level of ocular engagement the user has with the content being displayed by the user device. The eye-tracking module then provides the ocular engagement data to the content processing module. Further at this step, the expression processing module uses expression sensor data from the expression sensor (e.g., images and the like) to determine the emotional state of the user (e.g., confusion). The expression processing module then provides the emotional state data to the content processing module. Process 1000 continues to step 1018.

At step 1018, the content processing module is loaded into memory by the processor and instructs the processor to execute instructions to process the ocular engagement data and the emotional state data to determine if supplemental content is required. At this step, the content processing module determines if the ocular engagement data of the user indicates that the user is focusing his or her gaze on the content, or whether they have looked away or shown some other indicator of disengagement from the content. If the content processing module determines the user has disengaged with the content, the content processing module may pause the display of content on the user device and generate command data to retrieve supplemental data associated with the content being displayed on the user device. Further at this step, the content processing module determines if the emotional state data of the user indicates that the user is confused by the content being displayed on the user device. If the content processing module determines that the user is confused by the content, the content processing module may pause the display of content on the user device and generate command data to retrieve supplemental data associated with the content being displayed on the user device. If the command processing module determines that supplemental content is required, process 1000 proceeds to step 1008. Otherwise, process 1000 proceeds to step 1016.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

The invention claimed is:

1. A method comprising:
    generating, by a server, a visual presentation comprising a plurality of media elements corresponding to a portion of a text document, using an output data, for display in a first portion of a user interface of a computing device, wherein one word of a media element of the plurality of media elements is sequentially displayed for a predetermined amount of time and removed within the first portion of the user interface prior to display of a subsequent word of the media element on the first portion;
    generating, by the server, a first instruction configured to activate an expression sensor device configured to track facial micro-expressions of a user operating the computing device when the user is viewing the user interface and generate expression sensor data;
    upon activating the expression sensor device by transmitting the first instruction to the expression sensor device, receiving by the server, expression sensor data from the expression sensor device, wherein the expression sensor data is associated with the user viewing the user interface of the computing device;

determining, by the server, an expression state of the user based on the received expression sensor data;

determining, by the server, a media element from the plurality of media elements displayed on the first portion of the user interface being viewed by the user based on the expression sensor data;

in response to determining the expression state of the user as a first expression state:

generating, by the server, supplemental content data associated with the media element displayed in the first portion of the user interface where the supplemental content data is displayed in a second portion of the user interface, wherein the supplemental content data comprises a definition of a term corresponding to the media element based on a context of the term within the text document and a number of times the term is presented within the text document, and while displaying the supplemental content data, pausing, by the server, the display of the media element in the first portion, wherein the first expression state of the user corresponds to the user being at least one of confused, upset, and distracted.

2. The method of claim 1, wherein the output data is generated, by the server, in response to a request for content received from the user interface of the computing device, wherein the output data comprises external content data and internal content data.

3. The method of claim 2, wherein the external content data is associated with a database not associated with the computing device.

4. The method of claim 2, further comprising:

receiving, by the server, a request for content from the user interface of the computing device;

generating, by the server, a second instruction configured to receive data associated with the request for content; and upon transmitting the second instruction to a database, receiving by the server, data associated with the request for content.

5. The method of claim 1, wherein the portion of the output data is at least one of a word and a string of alphanumeric characters.

6. The method of claim 1, wherein the portion of the output data is a sentence.

7. The method of claim 1, wherein the portion of the output data is at least one of a figure and a picture.

8. The method of claim 1, further comprising, generating by the server, a third instruction configured to receive the supplemental content data in response to determining the expression state of the user as a first expression state.

9. The method of claim 1, further comprising:

in response to determining the expression state of the user as a second expression state, generating by the server, a fourth instruction configured to display a second portion of the output data, wherein the second portion of the output data does not include supplemental content.

10. The method of claim 9, wherein the second state corresponds to the user being content.

11. A computer system comprising:

a server configured to:

generate a visual presentation comprising a plurality of media elements corresponding to a portion of a text document using an output data for display in a first portion of a user interface of a computing device, wherein one word of a media element of the plurality of media elements is sequentially displayed for a predetermined amount of time and removed within the first portion of the user interface prior to display of a subsequent word of the media element on the first portion;

generate a first instruction configured to activate an expression sensor device configured to track facial micro-expressions of a user operating the user interface and generate expression sensor data;

upon activating the expression sensor device by transmitting the first instruction to the expression sensor device, receive expression sensor data from the expression sensor device, wherein the expression sensor data is associated with the user operating the user interface of the computing device;

determine an expression state of the user based on the received expression sensor data;

determine a media element from the plurality of media elements displayed on the first portion of the user interface being viewed by the user based on the expression sensor data;

in response to determining the expression state of the user as an expression state:

generate supplemental content data associated with the media element displayed in the first portion of the user interface where the supplemental content data is displayed in a second portion of the user interface, wherein the supplemental content data comprises a definition of a term corresponding to the media element based on a context of the term within the text document and a number of times the term is presented within the text document, and while displaying the supplemental content data, pause the display of the media element in the first portion, wherein the expression state of the user corresponds to the user being at least one of confused, upset, and distracted.

12. The computer system of claim 11, wherein the server is further configured to generate the output data in response to a request for content received from the user interface of the computing device, wherein the output data comprises external content data and internal content data.

13. The computer system of claim 12, wherein the external content data is associated with a database not associated with the computing device.

14. The computer system of to claim 12, wherein the server is further configured to:

receive request for content from the user interface of the computing device;

generate a second instruction configured to receive data associated with the request for content; and upon transmitting the second instruction to a database, receive data associated with the request for content.

15. The computer system of claim 11, wherein the portion of the output data is at least one of a word and a string of alphanumeric characters.

16. The computer system of claim 11, wherein the portion of the output data is a sentence.

17. The computer system of claim 11, wherein the portion of the output data is at least one of a figure and a picture.

18. The computer system of claim 11, wherein the server is further configured to generate a third instruction configured to receive the supplemental content data in response to determining the expression state of the user as the expression state.

* * * * *